United States Patent
Batz

[15] 3,705,385
[45] Dec. 5, 1972

[54] REMOTE METER READING SYSTEM
[72] Inventor: James E. Batz, Northbrook, Ill.
[73] Assignee: Northern Illinois Gas Company, Aurora, Ill.
[22] Filed: Dec. 10, 1969
[21] Appl. No.: 883,890

[52] U.S. Cl................340/152 R, 325/8, 343/6.8
[51] Int. Cl..........G01s 9/56, H04b 7/14, H04q 9/12
[58] Field of Search.................340/150–152, 171, 340/147; 179/2 DP, 15 FS, 15 BL; 325/8; 343/6.8, 180

[56] References Cited
UNITED STATES PATENTS

| | | |
|---|---|---|
| 3,261,922 | 7/1966 | Edson et al...............179/2 DP |
| 3,263,217 | 7/1966 | Boosman....................340/171 |
| 3,304,500 | 2/1967 | Likel........................179/2 DP |
| 3,406,344 | 10/1968 | Hopper......................179/2 DP |
| 3,484,694 | 12/1969 | Brothman et al. ......340/151 X |
| 3,492,649 | 1/1970 | Polillo....................340/147 X |
| 3,510,841 | 5/1970 | Lejon.........................340/151 |
| 3,566,234 | 2/1971 | Thomson..................325/8 X |

Primary Examiner—Donald J. Yusko
Attorney—Fred Jacob and Leo Stanger

[57] ABSTRACT

A system for selectively obtaining information from a plurality of remotely located data registers including a mobile or stationary transmitter for transmitting coded signals representing the identification number of a register to be read and a transponder at each register location for receiving the identification signals and responsive to readout signals transmitted from the transmitter to transmit back to the transmitter data signals representing the reading of the interrogated register.

49 Claims, 16 Drawing Figures

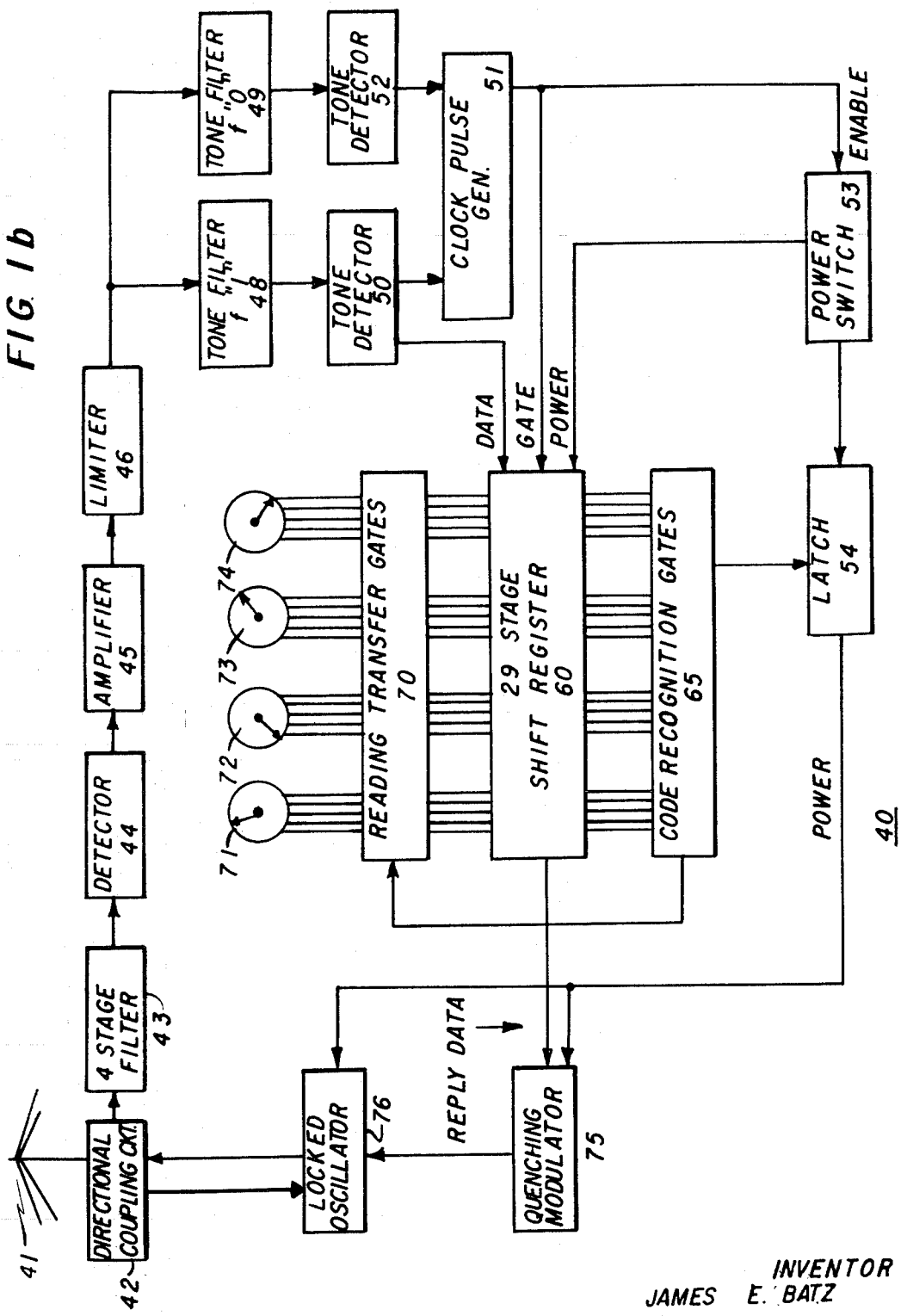

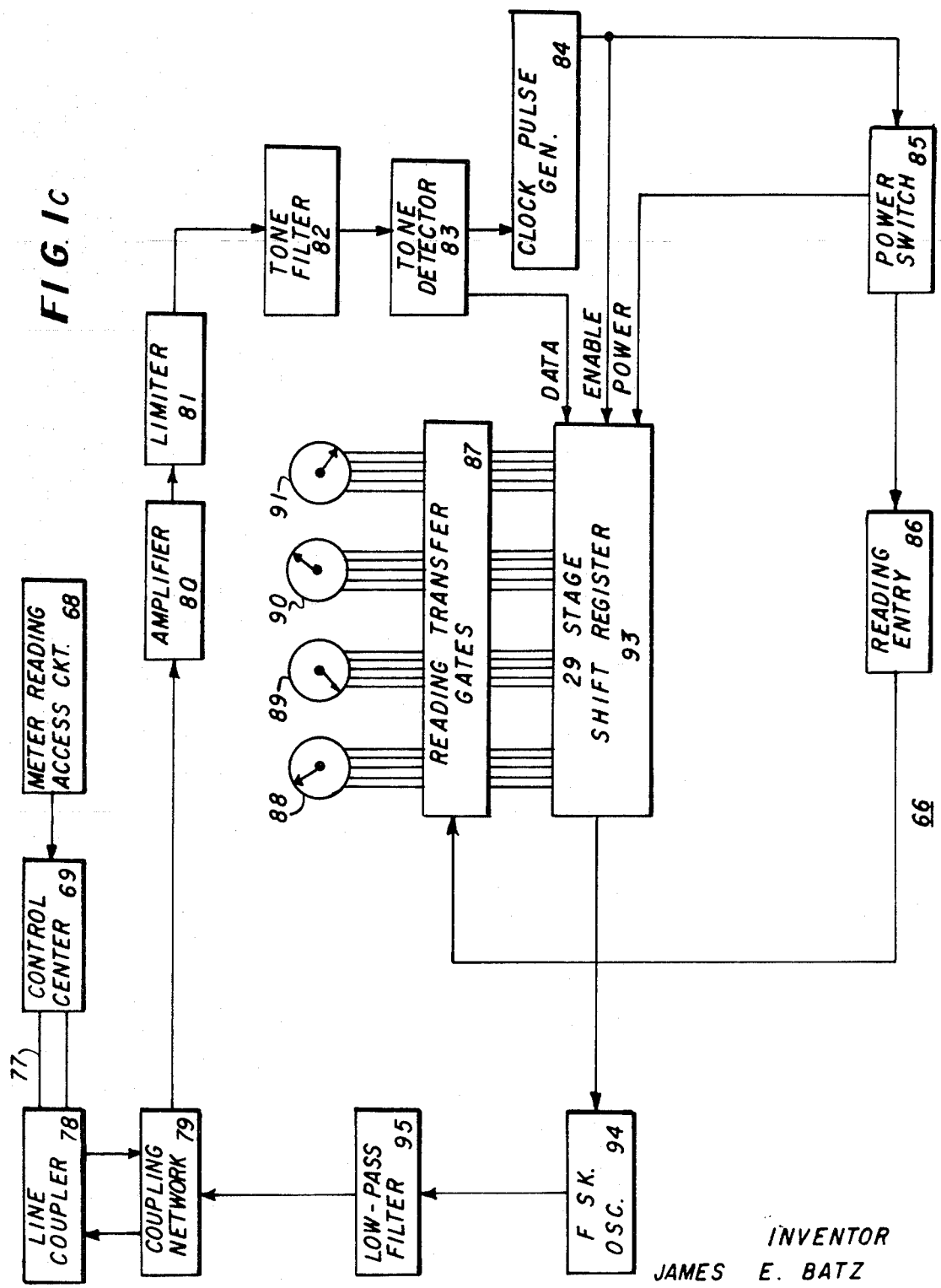

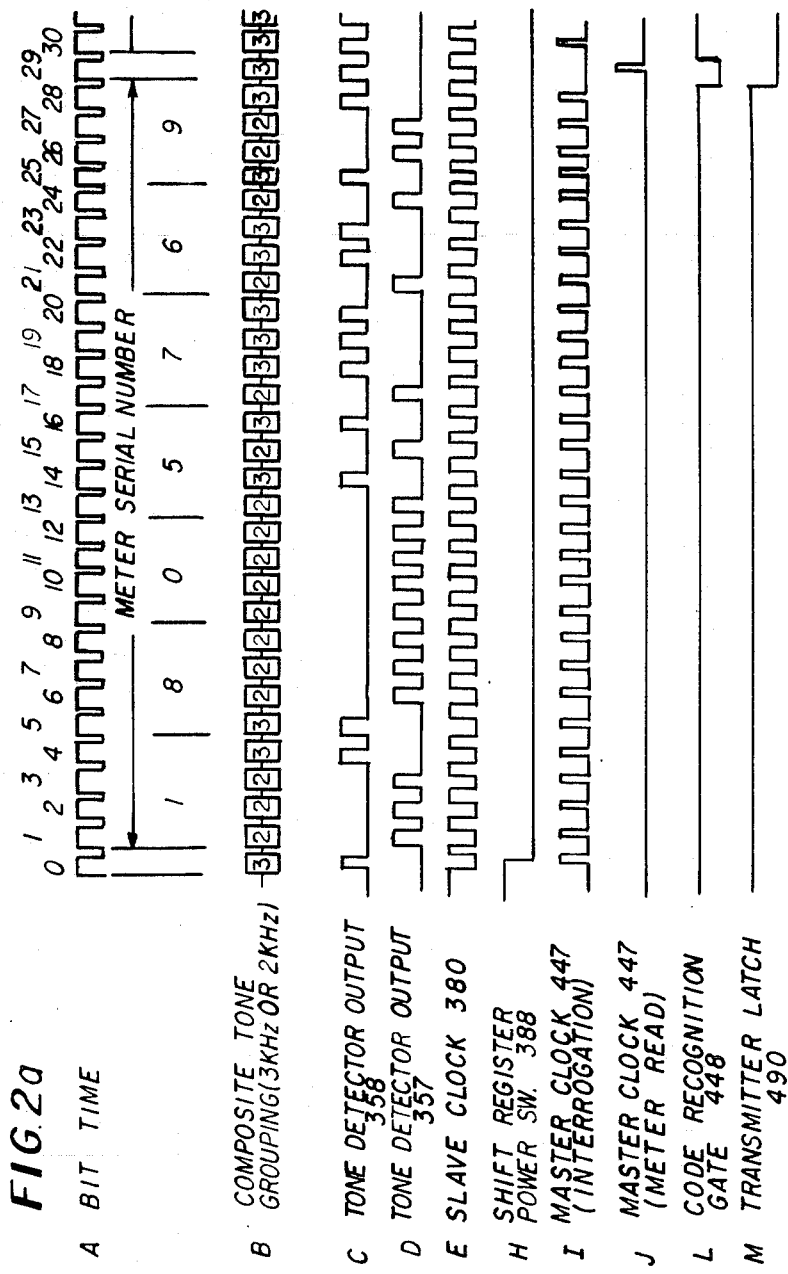

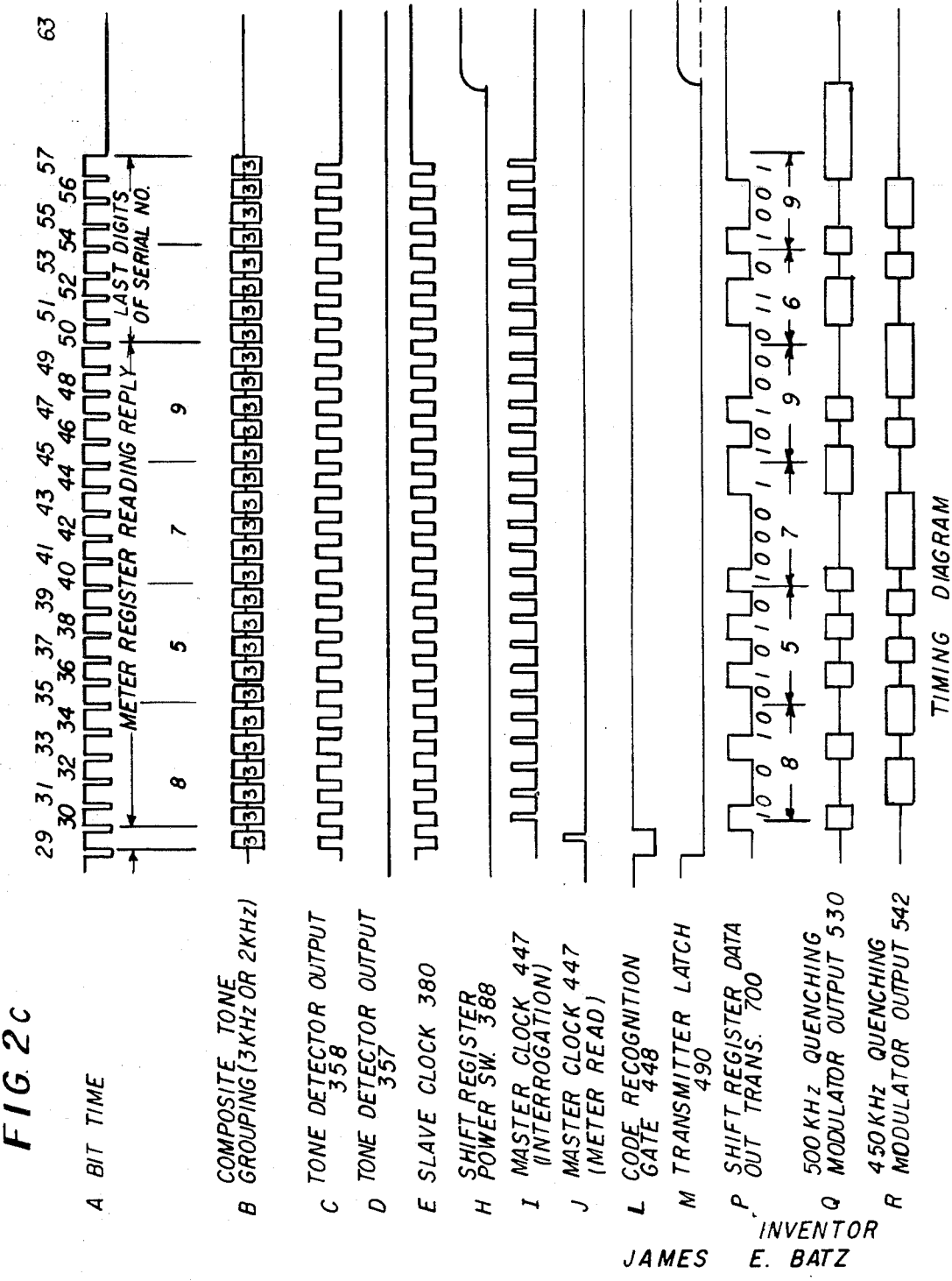

INVENTOR.
JAMES E. BATZ

BY

ATTYS.

| NUMBER | 0 | 1 | 2 | 3 | 4 | 5 | 6 | 7 | 8 | 9 |
|---|---|---|---|---|---|---|---|---|---|---|
| 0 |   | X | X |   | X |   |   | X |   |   |
| 1 |   | X |   | X |   | X |   |   | X |   |
| 2 |   |   | X | X |   |   | X |   |   | X |
| 4 | X |   |   |   | X | X | X |   |   |   |
| 7 | X |   |   |   |   |   |   | X | X | X |

2/5 ENCODING DISC. FOR METER REGISTER

INVENTOR
JAMES E. BATZ

BY
ATTYS.

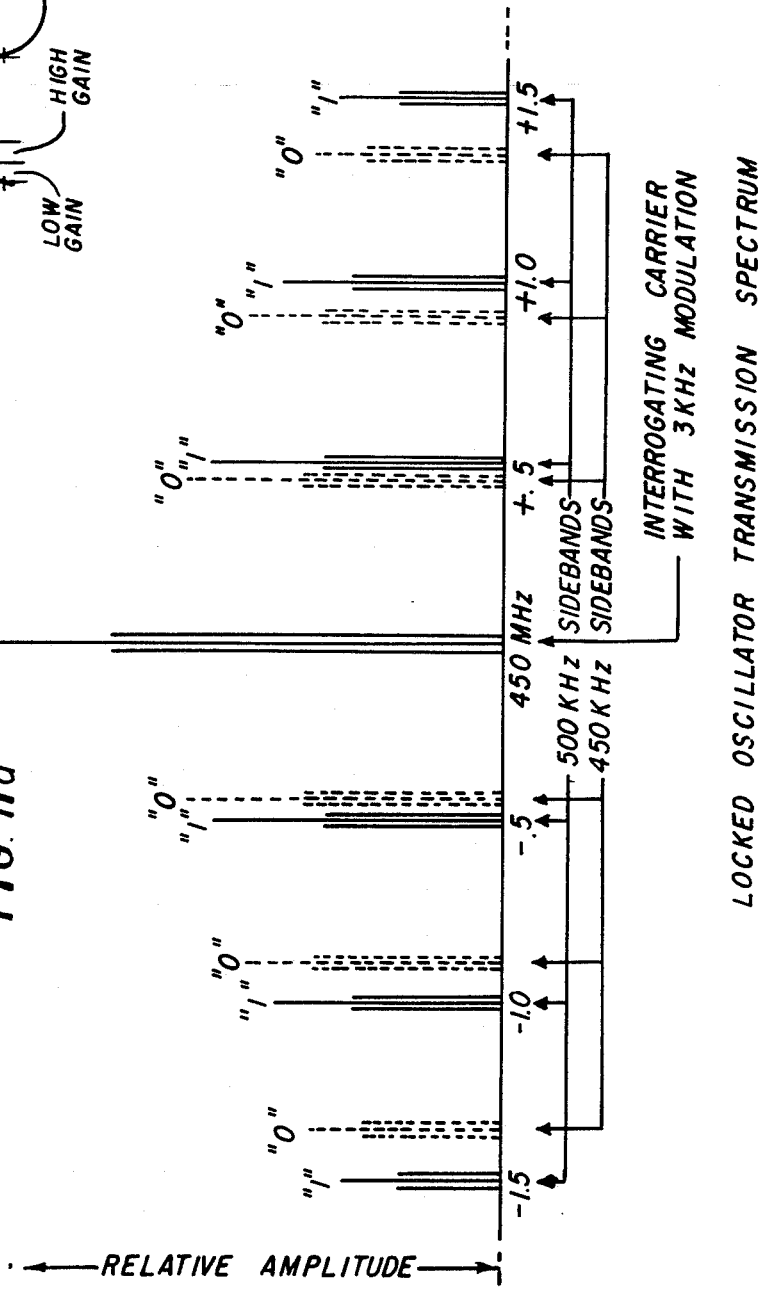

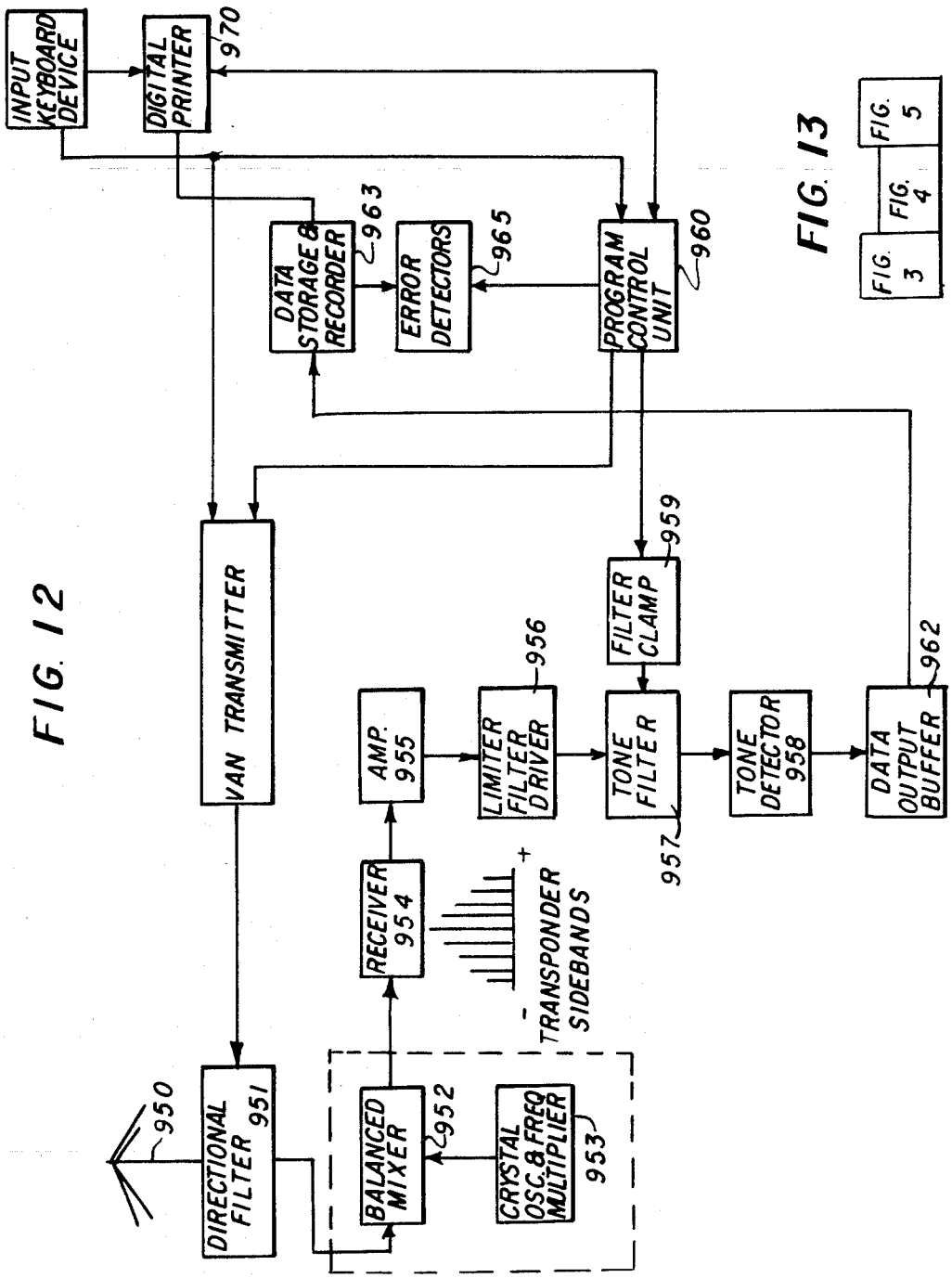

REMOTE METER READING SYSTEM

BACKGROUND OF THE INVENTION

1. Field of the Invention

This invention relates to remote register reading systems and more particularly, to a remote register reading system in which data representing a reading is transmitted over an RF signal link or a communication line to an interrogation point from a register remotely located from the interrogation point.

2. Description of the Prior Art

Meters which measure the consumption of a commodity such as gas, electricity, water, and the like and include a register for recording the amount of the commodity used are presently employed by utility companies as a means by which customer billings for the quantity of the commodity used are determined.

For purposes of billing the customer, readings of the meter register are made on a monthly or a bi-monthly basis. At the present time, the meter readings are taken by employees of a utility company who go to each meter location and read the meter registers directly to ascertain the quantity of a commodity used in a given period. Because of the large number of meters to be read during each billing period, the utility company must employ numerous meter readers. Moreover, while some modern homes and apartment buildings have utility meters located outside or in a readily accessible place to facilitate meter reading, many installations present the problem of "skip" readings necessitating repeat calls by a meter reader.

Each meter reader generally has a set of data cards, one for each meter to be read, and at each meter location, he checks the meter identification and indicates the reading of the meter on the corresponding data card. However, human error may be introduced into the reading of the meter and the marking of the reading on the data card.

To minimize repeat calls, external meter registers may be connected to the meter to register the meter reading at a location remote from the meter at an outside or more accessible location than the meter location. The remote register may include apparatus for registering the meter readings on a media suitable for direct processing by data processing equipment. Such systems lessen the chance of human error and "skip" readings, but still require numerous meter readers to obtain the necessary periodic readings of the meter registers.

A further step in the automation of meter reading has been an attempt to obtain the reading of the meter from a remote central location by way of a communication line such as the telephone line of the customer. To data, such systems have not proven feasible particularly because of the high cost involved in equipping each meter with a transmitter unit to transmit data representing the meter reading back to a meter interrogation center in response to an interrogating command sent to the meter unit from the interrogation center.

SUMMARY OF THE INVENTION

The present invention provides a system for obtaining information from a plurality of remotely located data indicating devices such as are associated with measuring or monitoring apparatus and used to accumulate data over a period of time or to provide instantaneous readings of a condition measured by the apparatus. By way of illustration, the system is described in an application for providing the remote readout of a meter register.

In the described systems, a transponder is provided at the location of each meter which is to be read and the readout of each meter is controlled from an interrogating position or a control station which may be mobile or fixed. Each meter transponder consists of a basic unit providing data control and data storage, and an RF module which is used to effect the reception of RF signals transmitted from the interrogating position, and the transmission of data representing the reading of the interrogated meter to the interrogating position. Alternately, a direct line module can be used to supplement the basic unit to permit interrogation of the meter over a communication line. The transponder unit forms a compact package which can easily be attached to existing meters.

The transponder employs solid-state circuits using low-cost, low-power solid-state devices, such as field-effect transistors. Such circuits can be manufactured using state of the art techniques whereby component cost is reduced and manufacturing costs are minimized.

The transponder is operationally feasible for remote meter reading applications because of the low power requirements of the transponder circuits. For example, most of the individual circuits which comprise the transponder of the present invention employ field-effect transistors which are, for the most part, connected in a complementary symmetry output configuration so that little power is drawn by the circuits.

Furthermore, the transponder includes a switching circuit which connects power to the transmitting section of the transponder only when the meter is being read.

Only the input section of each meter transponder is normally energized to receive the meter interrogation signals transmitted to the meter from the interrogating position.

Since the power requirements for the transponder are very low, the use of battery power, solar cells, etc., is feasible. Consequently, no external power source or utility connection is required to provide energization of the transponder at the remote location.

The transponder unit for remote meter reading systems which use RF signaling utilizes a unique transmitting technique in which readout signals transmitted from the interrogating position to effect readout of a remote meter are modified at the transponder to represent the data stored by the transponder being readout, and are retransmitted to the interrogating position.

The readout signals are modified and retransmitted by a transponder circuit referred to in this description as a "locked oscillator". The locked oscillator is controlled by a quenching modulator circuit to generate a series of RF sideband signals separated from the frequency of the readout signals by multiples of the frequency of the controlling signals generated by the quenching modulator circuit. The locked oscillator acts somewhat as a super-regenerative receiver, but is used in the transponder of the present invention as a transmitting source.

A receiver at the interrogating position is tuned to one of the sideband frequencies generated to detect the data being transmitted from the transponder. The signal reception at the interrogating position can be optimized by tuning the receiver to the sideband having the greatest amplitude and least interference from extraneous signals.

The frequency stability of the system is substantially independent of the transponder and is determined largely at the van interrogating position since the carrier signals transmitted therefrom are modified at the transponder to represent the data stored at the transponder and are retransmitted from the transponder to the interrogating position. The quenching modulator frequency is approximately a thousand times less than the carrier frequency and thus any variations in the quenching modulator frequency which might occur would have little affect on the retransmitted signals. Moreover, this frequency stability is obtained without the need to use a crystal-controlled oscillator, special temperature compensating circuits, an oven, or the like. Such considerations would tend to render the transponder economically unfeasible.

The synchronization of the readout of the data a bit at a time is effected by the readout signals transmitted from the interrogating source to the transponder. Thus, a clock pulse generating circuit for generating sync pulses at the transponder is not required.

A further advantage to the use of the locked oscillator controlled by a quenching modulator is that the signals generated by the locked oscillator reinforce the signals received at the transponder, and the sensitivity of the transponder receiver is increased. Accordingly, a greater transmission range between the interrogating point and the transponder can be obtained. In addition, the magnitude of the readout signals transmitted can be reduced so that there will be less interference at the interrogating position between the data signals received and the readout signals being simultaneously transmitted therefrom.

In the remote meter system provided by the present invention, the accessing of each meter, and the transmission of each data bit from the meter back to the interrogating point, is controlled from the interrogating point.

In one embodiment of the invention, for example, the interrogating unit is a mobile van which includes a radio frequency transmitter, receiving apparatus, and data processing equipment. Each meter to be read is selected by means of a binary code representation of an identification number for the meter. Amplitude modulated carrier signals representing the meter number are transmitted from the van. This allows the van to select the desired meter from all other meters in the immediate vicinity. Only upon receiving the proper coded interrogation signals will a transmitting unit associated with a remote meter respond with a register reading.

The interrogating signal is made up of two parts. The first part of the interrogation signal is a code that "unlocks" the responding portion of the meter addressed. The second part of the interrogation signal causes the meter reading data to be transmitted back to the van.

The binary coded data signals are transmitted from the van and received at the antenna of the transponder. The signals are detected at the transponder and are separated into two groups with the signals of one group representing a logic 1 and the signals of the other group representing a logic 0. The reception of either a logic 1 or a logic 0 signal actuates a power switch circuit of the transponder which applies power to a data storage shift register.

The logic 1 and logic 0 data signals are then combined to generate signals which are used to advance the data signals transmitted from the van through the shift register.

Each transponder includes signal recognition gates connected to the shift register which are wired to provide a logical code which corresponds to the identification number of the meter. Accordingly, only when the transmitted data signals corresponding to the meter identification number have been loaded into the shift registers of all meter transponders within the range of transmission of the van, will the states of the shift register stages of the transponder of the meter selected to be interrogated will correspond to the "wired logic" of the signal recognition gates. When such code recognition is obtained at a meter, data signals related to the reading of the meter register at such a meter are gated into the shift register. In addition, the transmitting portion of the transponder is energized.

Meter read out signals transmitted from the van during the second half of the interrogation cycle will cause the data stored in the shift register to be transmitted and also serve as a transmission medium for the reply data.

The reply data, which represents the reading of the selected meter, is transmitted to the van by means of the locked oscillator controlled by the quenching modulator circuit to modify the readout signals received from the van to represent the data stored at the transponder, and to retransmit the modified signals back to the van.

The locked oscillator comprises a transistor and a quarter wavelength resonant stub at the output of the transistor. The quarter wavelength stub is connected to the antenna of the transponder through an attenuation pad so that the signals received at the transponder are coupled both to the resonant circuit and the input of the transponder receiver.

Base drive for the transistor is supplied by the quenching modulator circuit which includes a pair of oscillator circuits for providing signals of first and second frequencies, respectively. Data signals provided at the output of the shift register in response to the reception of the readout signals control the quenching modulator to generate signals of either the first or the second frequency to effect the transmission back to the van of logic 1 or logic 0 data, respectively.

The varying drive provided by the quenching modulator for the transistor of the locked oscillator drives the transistor from cutoff through a region of high amplification, into oscillation, and to cutoff.

While the transistor is biased in the region of high amplification, the readout signals coupled to the tuned circuit load of the locked oscillator are fed to the input of the locked oscillator, amplified approximately 60 db, and passed back to the tuned circuit. The locked oscillator circuit "locks" to the frequency of the readout signal at the tuned circuit and generates a series of sideband signals separated from the frequency of the readout signal by a multiple of the frequency of the quenching modulator signal. One set of sidebands will be generated to represent logic 1 data whenever the first quenching modulator frequency is provided and another set of sidebands will be generated to represent logic 0 data whenever the second quenching modulator frequency is provided.

In the embodiment described, in which each readout signal transmitted from the van comprises an amplitude modulated carrier, the locked oscillator is operative to transfer the intelligence on the carrier to each of the sidebands generated.

A narrow band signal receiver at the interrogating vehicle is tuned to the frequency of one of the sideband signals generated by the transmitter of the interrogated meter to detect the meter reading data transmitted.

The meter reply data may be transmitted in a two out of five error detection code to improve the reliability of the data transmitted to the van. Accordingly, the van would include data processing equipment to compare the data received with other available data as a secondary check on the accuracy of the data received. Moreover, a plurality of interrogations of the same meter may be effected, and the data bits of each set of data returned to the van can be compared on a bit by bit basis by the data processing unit using a majority interpretation technique to determine which of the transmitted data represents the correct meter reading.

By using these techniques, the range of transmission of the van can be extended and a lower signal-to-noise-ratio can be tolerated by the system with little effect on the reliability of the transmitted readings.

While the described embodiment utilizes a mobile van as the interrogating vehicle, it will be apparent that such apparatus can also be located in aircraft or other mobile type equipment capable of transporting the interrogating and processing apparatus, or alternately in fixed locations such as towers and the like.

BRIEF DESCRIPTION OF THE DRAWINGS

FIG. 1b is a block diagram of a transponder adapted to receive radio frequency signals transmitted from the van shown in FIG. 1a;

FIG. 1c is a block diagram of a transponder adapted to be coupled to a telephone line;

FIG. 2a is a timing diagram showing the relationship between signals of the transponder circuits during interrogation of a meter;

FIG. 2b is an enlarged portion of the timing diagram of FIG. 2a;

FIG. 2c is a timing diagram showing the relationship between signals of the transponder circuit during transmission of reply data from the meter;

FIG. 11a shown the transmission spectrum of signals transmitted from the transponder;

FIG. 11b shows a cycle of the output of the quenching modulator circuit and is used in the description thereof;

FIG. 12 is a block diagram of the receiving circuits of a van; and,

FIG. 13 shows how FIGS. 3 to 5 are to be assembled;

DESCRIPTION OF THE PREFERRED EMBODIMENTS

General Description

Figure 1A:
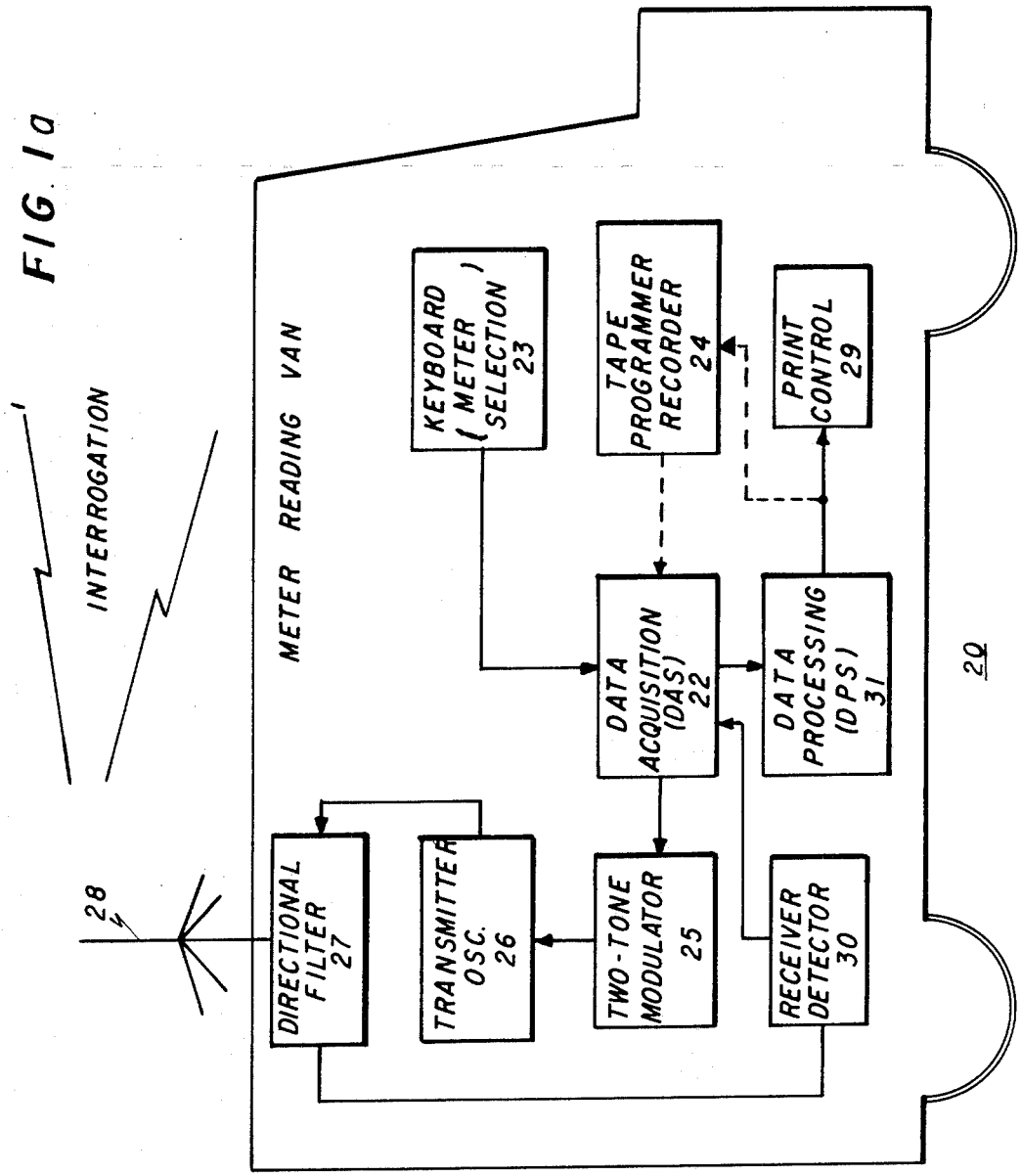
FIG. 1a is a block diagram of a meter reading for transmitting meter interrogation signals to a remote meter van.

Referring to FIG. 1a there is shown a block diagram of a mobile unit or van 20 for use in a system provided by the present invention, for reading utility meters via a two-way radio link established between the van 20 and a meter to be read. Coded signals representing an identification number for a meter selected to be interrogated are transmitted from the van. The meter address and readout signals generated at the van 20 are transmitted to all meter locations within the range of transmission of the van.

Each meter location includes a transponder unit, such as transponder 40 shown in block diagram form in FIG. 1b, for receiving the coded signals transmitted from the van and for transmitting back to the van other signals which represent the meter reading. The signals received at the van are decoded and the meter reading data obtained is recorded at the van.

Mobile Unit

The van 20 includes a data acquisition circuit (DAS) 22 and a meter selection keyboard 23 for supplying data, representative of a meter identification number, to the DAS circuit 22. Each meter is identified by a seven digit number. The meter selection data is keyed into the DAS circuit 22 in serial fashion by the van operator. Alternately, the circuit meter selection data may be programmed on magnetic or punched tape and supplied to the DAS circuit automatically by a tape programming and recording circuit 24. The DAS circuit 22 accepts the serial input data and generates seven groups of four pulses which represent the binary coding of the identification number of the meter selection to be read.

The DAS circuit 22 provides an additional data bit which precedes the 28 bits which form the binary coding of the meter number and is used to energize the transponder to permit storage of the meter identification signals.

The twenty-nine data bits selectively energize a two-tone modulator 25 which generates for each data bit either a 3 kHz tone burst to represent a logic 1, or a 2 kHz tone burst to represent a logic 0. The tone bursts which form the dual frequency code generated by the two-tone modulator 25 amplitude modulate a 450 mHz signal generated by a transmitter oscillator circuit 26. The amplitude modulated carrier signals thus provided at the output of the transmitter oscillator 26 pass through a directional filter 27 to an antenna 28 and are transmitted to all meter transponders within the range of transmission of the mobile unit.

The meter identification number is also passed from the DAS circuit 22 to a data processing unit 31 to provide suitable signals to energize a print control circuit 29 to effect printout of the meter identification number being transmitted. The data received from the meter interrogated will also be printed out adjacent the meter identification number.

Meter Transponder Unit

The amplitude modulated 450 mHz interrogation signals transmitted from the van 20 are received at all meter transponders within range of transmission of the mobile unit. Each transponder unit, such as transponder 40 shown in FIG. 1b, includes an antenna 41 connected to a directional coupling circuit 42. The interrogation signals pass through a bandpass filter 43 to a radio-frequency signal detector circuit 44 where the meter address data is separated from the 450 mHz carrier signals.

The bandpass filter 43 passes the interrogating carrier and its sidebands with a minimum of attenuation and supresses signals removed in frequency from the desired carrier. The detected signals consisting of 3 kHz tone bursts and 2 kHz tone bursts which represent respectively, the logic 1 and logic 0 coding of the identification number of the selected meter, pass from the output of the detector 44 to an amplifier 45, and a limiter circuit 46.

After amplification and limiting, the shaped signals are applied to the inputs of a pair of tone filters 48 and 49 which separate the logic 1 signals from the logic 0 signals. Tone filter 48, tuned to 3 kHz, passes signals representing the logic 1 data bits from the output of the limiter 46 to a tone detector 50. Tone filter 49, tuned to 2 kHz, passes signals representing logic 0 data bits to a tone detector 52.

Shift Register

The transponder includes a 29 stage shift register 60 for storing, temporarily, the 29 data bits which comprise the meter identification data transmitted from the van. Since the signals which represent the binary coding of the meter number are complementary, only logic 1 signals provided at the output of tone detector 50 are passed to the shift register 60.

The 29 data bits are entered into the shift register serially and advanced from the first stage to the last stage by clock pulses provided by a clock pulse generator 51. The clock pulse generator 51 is responsive to signals at the output of tone detectors 50 and 52 to provide the clock pulses for gating the data signals through the shift register. The clock pulse generator circuit 51 also provides an enabling pulse for operating a power switch 53 which supplies power to the shift register.

The meter transponder 40 has been designed for low power consumption so that the transponder may be battery powered. The input stages of the transponder, including the radio frequency signal detector 44, the amplifier 45, the limiter 46, tone detectors 50 and 52 and the clock pulse generator circuit 51 have power applied on a continual basis. However, these circuits include passive elements, and complementary field-effect devices which draw little current. Consequently, the power requirements of the transponder circuit are low enough to make the use of battery power feasible.

When the first data pulse, the signal which precedes the 28 bit binary address, is received and passed to the tone detector 50, the clock pulse generator provides a gating pulse for gating data into the shift register, and an enable signal to energize the power switch 53 and supply power to shift register 60. The power switch 53 supplies operating power to the shift register each time data signals are received at the transponder. Thus, each transponder within receiving range of the van will have power applied to its corresponding shift register in response to signals transmitted from the van.

The power switch 53 remains operated for a maximum of 50 milliseconds after the last data bit has been received after which time the power switch will turn off until a subsequent input is detected by the transponder. In addition, the power switch will be disabled whenever the data train is interrupted for more than three bits.

The meter information data transmitted from the van is received by the transponder of each meter located within the range of transmission of the van and the data will be entered serially into the shift register of each transponder.

In accordance with the principles of the invention, only the meter selected to be interrogated will be enabled to transmit back to the van data which indicates the reading of the meter. Each transponder includes a set of 29 code recognition gates 65 one gate connected to each stage of the shift register 60. The code recognition gates present a coding which is identical to the states of the shift register stages of the selected meter when the interrogation data is stored therein. When the data stored in the shift register 60 corresponds to the pattern of data provided by the code recognition gates 65 a code recognition signal is provided which enables a set of reading transfer gates 70 to gate signals corresponding to the angular position of each of a plurality of digit wheels 71–74 of the selected meter, and accordingly the reading of the meter, into the shift register. The meter reading data for each meter disc is gated into the shift register by parallel transfer effectively under the control of the operator at the van.

Each of the four meter discs 71–74 provides five bits which code the positions of the disc which correspond to units 0–9 of the commodity used in a two-out-of-five signal code, and the shift register thus stores 20 bits which represent the meter reading. In addition, the register retains the logic one check bit and the eight bits representing the last two digits of the identification number of the meter selected. The last two digits of the meter address when transmitted to the van along with the meter data provide a basis for comparison with the last two digits of the meter address that was recorded at the van when the interrogate signals were transmitted.

Transmitter Latch Circuit

When the code recognition gates provide a parity signal, a signal generated by the code recognition gates 65 energizes a transmitter latch circuit 54 which supplies power to a quenching modulator 75 and locked oscillator 76 which transmit reply data back to the van. The transmitter latch, once energized, remains operative for approximately 500 milliseconds which is sufficient to assure transmission of the data stored in the shift register. When the power switch turns off, it also disables the latch circuit 54. Under no conditions can the transmitting portion of the transponder be held in a operated condition for longer than 500 milliseconds. When the latch circuit 54 is enabled, the quenching modulator 75 and locked oscillator 76 are prepared for the transmission of meter reading data back to the van.

Reply

After the 29 bit address signals have been transmitted from the van to the transponder, the data acquisition circuit 22 effects the generation of a series of twenty-nine signals which are used to readout the data stored in shift register 60 of the transponder 40. The readout of the data from the shift register is controlled from the van.

The 29 readout signals are converted into 3 kHz tone bursts in the two-tone modulator 25 of the van 20 used to amplitude modulate the 450 mHz signal of the transmitter and transmitted to the transponder. The amplitude modulated readout signals transmitted pass through the directional coupling network 42 and the bandpass filter 43 to the detector 44 where the information is recovered from 450 mHz carrier wave signals. The 3 kHz tone burst signal output from the detector is amplified by amplifier 45 and passed through the limiter 46 and tone filter 48 to the tone detector 50. The pulses at the output of the detector 50 will cause the clock pulse generator 51 to provide clock signals to enable the power switch 53 to remain turned on so that power continues to be supplied to the shift register during readout. As the twenty-nine readout signals are gated into the shift register, the data pulses stored in the shift register are shifted out of the register and passed to the input of a quenching modulator 75 of the transponder.

Transponder Transmitting Circuit

The data pulses are used to control the transmitting portion of the transponder which includes the quenching modulator circuit 75 and the locked oscillator 76. The locked oscillator circuit 76 is basically an oscillator which includes a transistor that is swung from the cut-off region through a region of high amplification and finally into oscillation. This is accomplished by varying the base current, and thus, the collector current of the transistor. Base drive for this transistor is provided by the quenching modulator 75. During the period of high amplification, any signal in excess of approximately −90 dbm received at the antenna 41 will cause the super regenerative circuit to lock to the received frequency for a portion of each cycle of the quenching modulator 75 producing a spectrum of RF components separated in frequency by the quenching modulator frequency.

The transmitting circuit is similar in operation to a super regenerative detector having its quenching frequency supplied to the oscillator 76 by the quenching modulator circuit 75. The frequency of the quenching modulator signal is determined by the data pulses shifted out of the shift register. A logic 0 output will cause a 450 kHz modulating signal to be generated and a logic 1 output will cause a 500 kHz modulating signal to be generated. The modulating signals drive the locked oscillator 76 to generate a series of RF side bands separated from the 450 mHz interrogating RF frequency by multiples of the frequency of the quenching modulator signal. Each of the side bands have the same tone burst modulation (3 kHz) that is received on the interrogating carrier transmitted from the van. The frequency of the reply signal is therefore largely determined by the interrogating signal.

Reception of Data at Van

The radio frequency signals transmitted from the transponder are received at the antenna 28 of the van 20 and passed through directional filter 27 to a receiver 30. The receiver is tuned to one of the sidebands of the transmitted spectrum of signals and detects signals of the tuned frequency, separates the intelligence from the signals, and provides appropriate signal wave shaping prior to passing the transmitted data to the data acquisition circuit 22. Since the signals are complementary, the detection of either logic one or the logic zero data signals will be sufficient to obtain the information which relates the intelligence transmitted from the transponder.

Various arrangements can be employed for the detection of the signals transmitted from the transponder unit 40. As mentioned above, a single receiver can be used which is tuned to one of the stronger side band signals, or alternately, a plurality of receivers can be used, each tuned to a different sideband of either 500 kHz or 450 kHz spacings and the outputs of all the receivers can be compared to determined the majority output to select the information to be recorded at the van.

The signals received at the van and passed through the receiver and the DAS circuit 22 are then processed by the data processing circuit 31 and converted from the two-out-of-five code to decimal form.

Decoded signals representative of the meter reading and of the last two digits of the meter identification number are used to control a print control circuit 29 to provide the printout of the meter reading as transmitted from the transponder and decoded at the van.

The data is recorded on magnetic or punched tape and is printed out on a suitable media adjacent the meter identification number which was printed out as the meter selection signals were transmitted. The last two digits of the meter identification number are compared with the last two digits of the data transmitted from the transponder to provide an indication of whether or not correct data has been received.

The above preferred embodiment of a remote meter reading system employs a mobile unit or van 20 which is driven in the vicinity of the meters which are to be read. Alternatively, the radio frequency interrogation signals could be transmitted from a central location via microwave towers or the like to all meters within a predetermined transmitting range.

Direct Line Interrogation of Remote Meter

Referring to FIG. 1c, there is shown an arrangement in which the interrogation signals are sent directly to a meter transponder 66 over a data line 77 which may be, for instance, a telephone line.

To interrogate a meter, such as one associated with the transponder 66, shown in FIG. 1c, the interrogation signals are generated at the central control 69 and are passed over a telephone line 77 to the transponder. The transponder includes an input section comprised of an amplifier 80 a limiter 81, a tone filter 82 and a tone detector 83 connected in series. The transponder further includes a twenty-nine stage shift register 93, meter discs 88 to 91, and reading transfer gates 87 for gating signals from the discs 88–91 into the register 93.

The input section of the transponder, the shift register 93, meter discs 88–91 and reading transfer gates 87 are similar to those discussed in the foregoing with reference to FIG. 1b.

In the control center 69, a meter reading access circuit 68 selects a meter which is to be read, and causes a signal to be transmitted to the meter transponder 66 over the telephone line, 77 causing power to be applied to the transponder circuit. The signals received at a line coupler 78 pass to a coupling network 79 and through the amplifier 80 and the limiter 81 to the tone filter 82 and the tone detector 83. The signal at the output of the tone detector 83 enables a clock generator circuit 84 to generate a clock pulse which energizes the power switch 85 applying power to the transponder circuit. The power is supplied by the line coupler 78 which is connected to the telephone line 77.

Application of power to the transponder will cause the reading entry circuit 86 to energize the reading transfer gates 87 for a time sufficient to gate the meter reading data from meter discs 88 to 91 into the shift register 93. The shift register 93 will store the meter reading coded in the two-out-of-five code, as described above with reference to the RF interrogation arrangement.

Readout pulses are generated at the control center for reading out the contents of the shift register a bit at a time. The output of the shift register 93 is connected to a frequency shift keying oscillator 94 the output of which is connected to the coupling network 79 through a low pass filter 95. Data at the output of the shift register 93 is used to shift the frequency of the FSK oscillator 94 approximately 200 Hz to designate a logic 1 and back again to the rest frequency for each logic 0 condition of the shift register output. The low pass filter 95 is used to reduce the harmonic content of the transmitted signal.

The readout of the remote meter can be repeated without dialing the subscriber by reenergizing the reading transfer gates to again transfer the meter reading from the meter discs 88-91 to the shift register and by sending a further set of readout pulses from the control center 69.

Duplex operation is used in this arrangement to facilitate the transmission of data from the control center 69 to the transponder and from the transponder back to the control center 69.

Specific Description

Figure 2B:
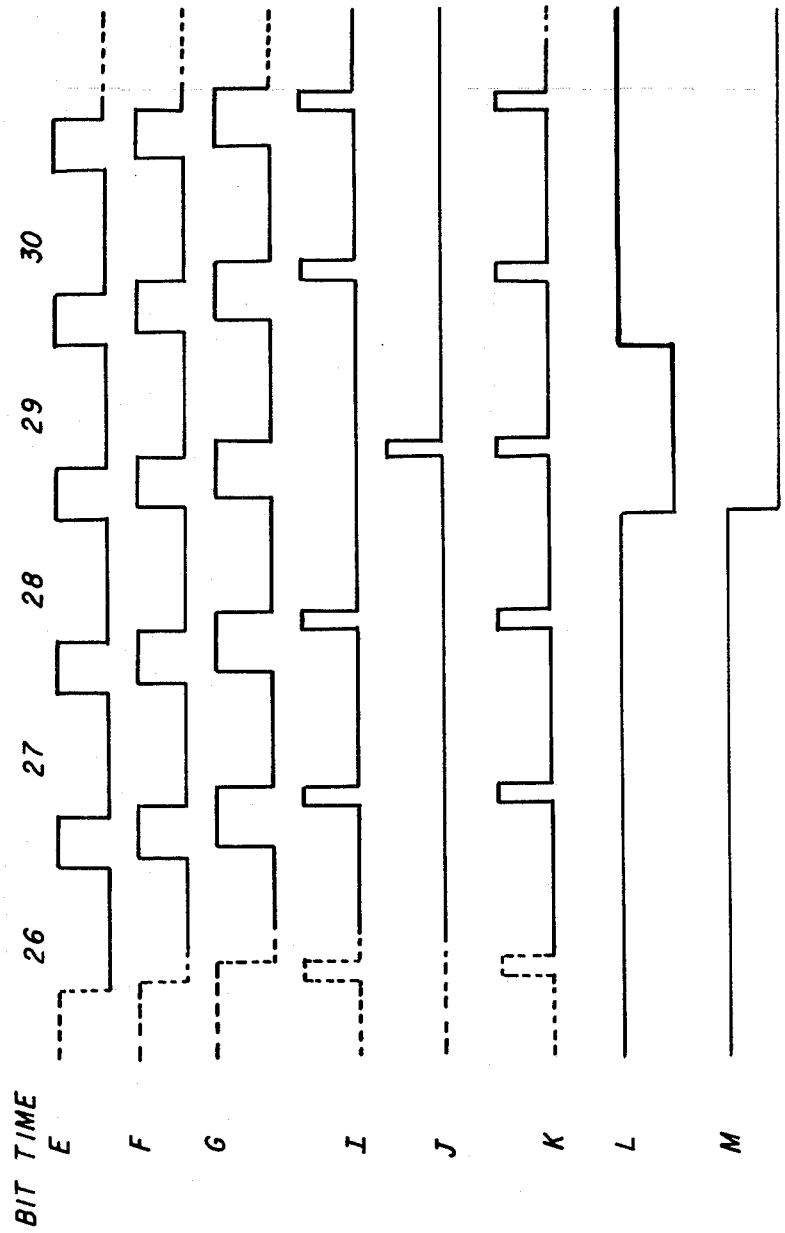

The specific operation of the system can best be described with reference to the schematic circuit diagram given in FIGS. 3 to 5, and the timing diagrams shown in FIGS. 2a, 2b and 2c. The reference letters A through R of FIGS. 2a–2c are also shown at the points in the circuits of the drawings FIGS. 3–5 where the waveforms would occur.

The timing diagram for the interrogating cycle bit times 0 to 28 is given in FIG. 2a. The interrogation cycle is comprised of 29 bit times 0 to 28 shown in line A. A check bit is generated during the zero bit time of the interrogation cycle and 28 pulses representing the coding of the meter identification number, assumed to be 1,805,769, are generated during bit times 1 to 28. Accordingly, as shown in FIG. 2a line B, the composite tone grouping of 3 kHz signals representing either a logic 1 or a logic 0 for coding the meter identification number into binary digits is given.

For example, during bit time zero, a 3 kHz signal is generated to represent a logic 1 for the check digit. During bit times one through four, a series of four tones is generated to represent the binary coding for the digit 1, the first digit of the meter identification number. During bit times five through 28, sets of four tones are generated to represent the binary coding of the other six digits of the meter serial number.

Tones of the frequencies in the boxes in line B of FIG. 2a, aligned with bit times 0 through 28, are provided by the two-tone modulator 25 shown in FIG. 1a responsive to the keying into the DAS 22 by the van operator of signals representing the identification number of the meter to be addressed. These tones amplitude modulate the 450 mHz signal generated by the transmitter oscillator 26, and the amplitude modulated signal from the oscillator 26 is transmitted to meter transponder 40 shown in FIG. 1b and also shown in detail in FIGS. 3–5.

The signals transmitted from the van are received at the antenna 301 and passed through a coupling network 300 comprised of an attenation pad including resistors 302, 303 and 304.

The signals pass through a bandpass filter 305 which will pass only frequencies in the neighborhood of the interrogate signal which is 450 mHz. The filter 305 provides approximately 40 db of attenuation for frequencies 20 mHz or more away from the central frequency of 450 mHz. The bandpass filter 305 consists of four capacitively coupled parallel resonant circuits 307–310.

A center tap of an inductor 306 of input section 307 is connected to attenuation pad resistor 304. Filter section 307 is coupled to section 308 by a capacitor 311; section 308 is coupled to section 309 by a capacitor 312; and section 309 is coupled to output section 310 by a capacitor 313. Passive filter sections are used in the bandpass filter 305 in order to minimize power requirements for the transponder.

The output section 310 of the bandpass filter 305 has a center tap 316 of inductor 314 connected to the anode 317 of a diode 318, which may be a 1N930 video diode. The diode 318 functions as a detector to separate the 2 kHz and 3 kHz information from the 450 mHz carrier signal.

The signals which will be present at the output of the detector 318 will be a series of tone bursts of 3 kHz and 2 kHz frequencies which form the binary coding of the meter identification number. A capacitor 319 is connected from the cathode 320 of the diode 318 to ground.

The output of the detector stage, the cathode 320 of diode 318, is connected to the input of an amplifier 322. The amplifier 322 comprises a multi-stage, non-inverting amplifier including metal-oxide silicon field-effect transistors (MOSFET), and a bipolar transistor such as a 2N2605 used for the input stage. A suitable MOSFET transistor for this application is the 2N4352 which exhibits low operating current requirements and good limiting characteristics. The bipolar transistor is used for the input stage of the amplifier 322 because of its low noise characteristics and good beta at low temperature and collector current levels.

The signals present at the output of the amplifier 322 are passed to the input of a limiter stage 330. The input signals are coupled to the base of PNP transistor 331, such as 2N2605, of the limiter circuit 330 through a capacitor 332. The emitter of the transistor 331 is connected to ground, and the collector of transistor 331 is connected to a voltage source −V through a resistor 334. The base of transistor 331 is also connected to the voltage source −V through a resistor 335.

Power to operate the transponder is obtained from a Mallory Type TR-164 5.6 volt mercury battery or equivalent. The negative terminal of the battery is connected to the points of the circuit marked −V and the positive terminal is connected to points marked with the ground symbol.

The collector of transistor 331 is connected to the base of a second PNP transistor 337, such as a type 2N2605, of the limiter circuit 330. The emitter of transistor 337 is connected to the voltage supply −V through a resistor 338. The output of the limiter circuit, taken from the collector of transistor 337, is connected to a filter driver circuit 340 which includes complementary mosfet devices 341 and 342 which may be 2N4352 and 2N4351, respectively, which provide a low output impedance for the limiter circuit 330. The collector of transistor 337 is connected to the gates of transistors 341 and 342, which are connected to −V and to ground, respectively. Transistor 341, which has its substrate connected to −V, is an N-type device, and transistor 342 which has its substrate connected to ground, is a P-type device. The substrates of other similar MOSFET'S of the transponder circuit are also connected to appropriate voltages.

The sources of transistor 341 is connected to the voltage source −V. The source of transistor 342 is connected to ground. The drains D of transistor 341 and 342 are connected together and form the output of the limiter circuit.

The amplified and limited signals are impressed upon a pair of tone filters 349 and 350 which are tuned to 2 kHz and 3 kHz, respectively to detect the signals representative of logic 0 and logic 1 levels, respectively. Tone filters 349 and 350 are passive circuits in order to minimize power requirements of the transponder.

One of the tone filters 349 consists of a parallel tuned resonant circuit including a capacitor 351 and an inductor 352 and is coupled to the drains of transistors 341 and 342 of the limiter 330 through a capacitor 353. One terminal of the tuned circuit 349 is connected to the capacitor 353 and the other terminal is connected to the voltage source −V. The circuit 349 is tuned to 2 kHz to resonate at the frequency representing logic zero levels.

The other tone filter 350 is also a parallel resonant tuned circuit. Filter 350 includes a capacitor 355 and an inductor 356, and is coupled to transistor 341 and 342 at the output of the limiter circuit 330 through a capacitor 354. One terminal of the tuned circuit 350 is connected to the capacitor 354, and the other terminal is connected to the voltage source. Filter circuit 350 is tuned to 3 kHz to resonate at the frequency representing logic 1 levels. For each logic one signal transmitted from the van, a 3 kHz tone burst is provided at the input of tone detector 358. Similarly, for each logic 0 signal transmitted, a 2 kHz tone burst is provided at the input of tone detector 357. The outputs of the tone filters 349 and 350 are connected to individual tone detectors, 357 and 358. The tone detectors are similar, and accordingly, only tone detector 358 is shown in detail.

Tone Detectors

Tone detector 358 consists of an input stage including a transistor 360, for charging a capacitor 361, followed by a Schmitt trigger circuit comprised of transistors 362 and 363, and output buffer amplifiers 368 and 369.

The base of transistor 360, which may be a bipolar NPN transistor type 2N930, is connected to tone filter 350. Transistor 360 has its emitter connected to −V through a resistor 371. A capacitor 361 is connected in parallel with resistor 370. The base of transistor 362 of the Schmitt trigger circuit is connected to the emitter of transistor 360. Transistor 360 is connected as in the emitter-follower configuration. The emitter of transistor 362 is connected to the emitter of transistor 363 at the output of the Schmitt trigger circuit and to ground through a resistor 373. The collector of transistor 362 is connected to −V through a resistor 374 and to the base of transistor 363. The collector of transistor 363 is connected to −V, through a resistor 375. Transistors 362 and 363 may be 2N2605 PNP type transistors.

The output of the Schmitt trigger, the collector of transistor 363, is connected to the input of amplifier 368 and the output of amplifier 368 is connected to the input of amplifier 369.

Transistors 360 and 363 are normally cut-off and transistor 362 is normally on. The emitter follower 360 presents a high impedance to the tone filter 350 comprised of capacitor 355 and inductor 356. Moreover, the emitter follower 360 provides a low impedance charge path for capacitor 361 when transistor 360 is conducting. In the absence of a tone signal, transistor 360 is cut-off and its emitter will be at −V potential. Capacitor 361 will discharge through resistor 370. The potential at the emitter of transistor 360 is sufficient to drive transistor 362 of the Schmitt trigger circuit into conduction and maintain transistor 363 in the turned-off condition. The capacitor 361 is maintained discharged by resistor 370.

When a 3 kHz tone representing a logic one is received, a sinusoidal signal of a frequency of a 3 kHz builds up across the tone filter 350. Each positive going half cycle of the sine wave causes transistor 360 to conduct thereby providing a charging path for capacitor 361 through resistor 371 and the emitter-collector junction of transistor 360. The negative going half cycles of the sine wave turn transistor 360 off allowing capacitor 361 to start to discharge through resistor 370. Due to the high ratio of the magnitude of resistor 370 to the magnitude of resistor 371 capacitor 361 charges quickly but discharges at a slower rate.

When the voltage across capacitor 361 increases in response to the charging of capacitor 361 through transistor 360 and resistor 371, transistor 363 begins to conduct as transistor 362 turns off, and transistor 362 is driven to cut-off. The build-up time of the tone filter 350 and the threshold setting of the tone detector Schmitt trigger, comprising transistors 362 and 363, cause a time delay between the reception of the tone and the conduction of transistor 363. The charge time of capacitor 361 and the hysterisis of the Schmitt trigger circuit is such that once the threshold of transistor 362 has been exceeded as the input signal is building up from −V to ground, the slight discharging of capacitor 361 during the negative half cycles of the sine wave input signal is not sufficient to cause the Schmitt trigger circuit to revert to its original state. As the tone level across the inductor 356 begins to decay at the end of the input tone burst, the charge on capacitor 361 is allowed to decrease. When the level reaches the turnon threshold for transistor 362, transistor 362 is again driven into conduction causing transistor 363 to be turned off. Accordingly, a pulse of approximately the same width as the input tone burst, but delayed in time, will be generated by the Schmitt trigger circuit.

The output of the Schmitt trigger at the collector of transistor 363 has been labeled C is shown in line C of FIG. 2a. The signal output from the Schmitt trigger is amplified and inverted by each of the serially connected amplifiers 368 and 369.

The output of tone detector 357, point D, and the output of tone detector 358, point C, are connected to an input of a two-stage amplifier 380. Isolation of the output of tone detector 358 from tone detector 357 is provided by amplifier 369. Tone detector 357 also includes an output buffer amplifier.

The output of amplifier 380, point E is shown on line E of FIG. 2a. Amplifier 380 acts as a summing amplifier, and accordingly, the output of tone detectors 357 and 358 are combined to provide a series of twenty-nine pulses. Amplifier 380 inverts the signals present at the outputs of the tone detectors.

The output of the tone detector 358 is also connected to an input of a data amplifier 385 which inverts the signals provided at the output of tone detector 358.

Shift Register

Figure 5:
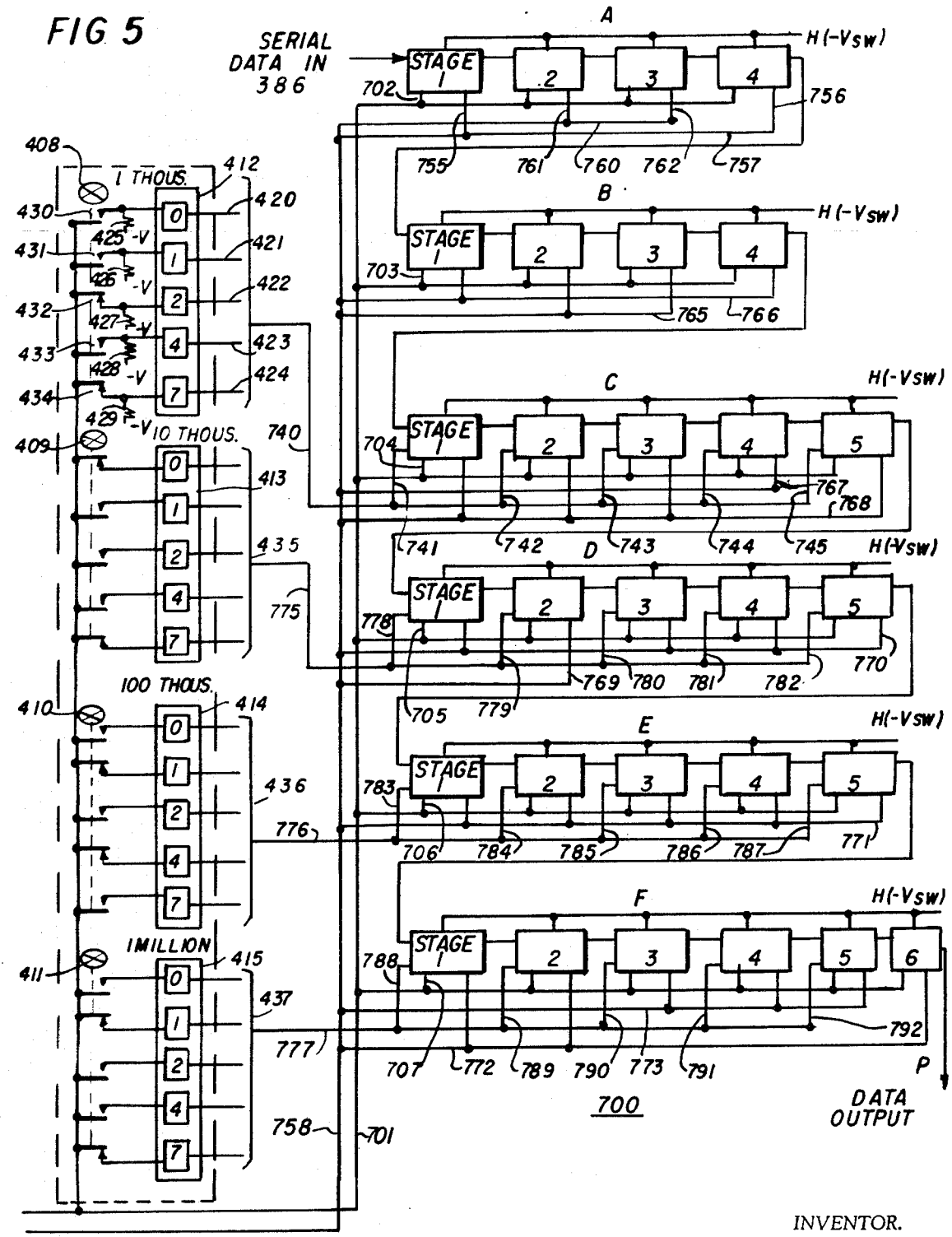

The output of the data amplifier 385 is extended to the serial input 386 of a 29 stage shift register 700 shown in FIG. 5. Since the outputs of tone detectors 357 and 358 are complementary, only the signals provided at the output of tone detector 358 are passed to the shift register.

For purposes of illustration, the shift register is arranged in six sections A–F with sections A and B having four stages, sections C, D and E including five stages and section F including six stages. All of these stages are connected in tandem to permit serial entry of data and the shifting of data from the input of the shift register to the output of the shift register. In addition, data can be transferred into the twenty-nine stages of the shift register in parallel.

Figure 6:
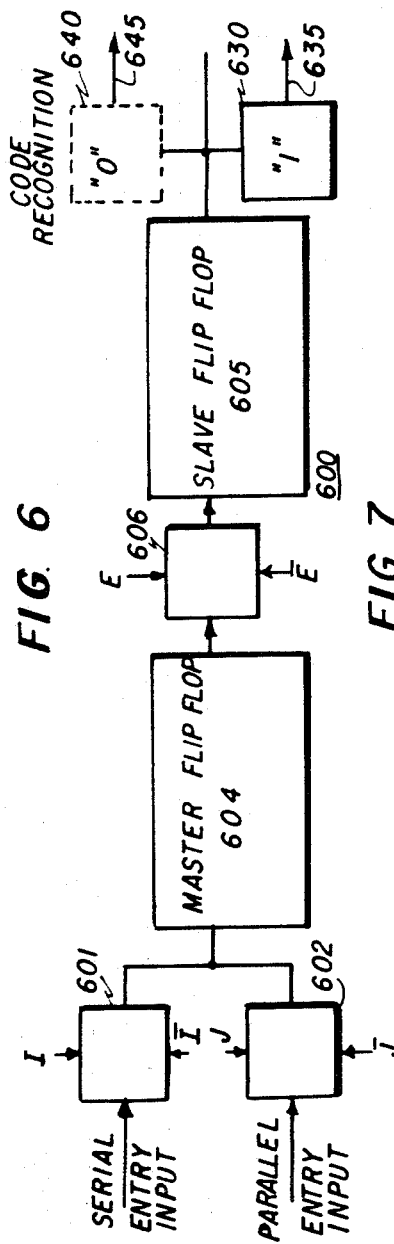
FIG. 6 is a block diagram of one stage of a shift register of the transponder unit.

Referring to FIG. 6, there is shown in block diagram form the basic components of a shift register stage 600. Each of the 29 stages of shift register 700 are similar to the stage 600 and include a serial entry gate, such as gate 601, and a parallel entry gate such as gate 602. In the described embodiment stages of sections A and B and stage F-6 do not receive data via parallel entry and accordingly the parallel entry gates for there stages would not be connected.

The serial entry gate 601 is enabled by signals or pulses I and $\bar{I}$ to pass serial data to a master flip flop 604. Similarly, the parallel entry gate 602 is enabled by signals or pulses J and $\bar{J}$ to pass data to the master flip flop 604. The data in the master flip flop 604 is advanced to a slave flip flop 605 when a slave gate 606, interposed between the master flip flop and the slave flip flop, is enabled by signals or pulses E and $\bar{E}$.

The data signals provided at the output of the detector circuit 358, as shown online C of FIG. 2a, either a logic 1 or a logic 0 levels, are received in succession at the serial entry input of gate 601, and are passed individually through gate 601 to the master flip-flop when pulses I and $\bar{I}$ are generated. Referring to the waveform relationships shown in FIG. 7, whenever a tone representing a data bit is detected by either detector 357 or 358, signal E goes to −V disabling gate 606. A short time thereafter, approximately 50 microseconds, signal I becomes a ground potential enabling the serial entry gate 601 to pass the data from the output of the tone detector 358 into the master flip flop 604. Signal I then returns to −V disabling serial data input gate 601. Thereafter, signal E returns to ground potential, permitting the information from the tone detector 358 that is stored in the master flip flop 604 to be transferred to the slave flip flop 605 through gate 606. The output of the slave flip flop 605 is connected to a serial entry gate of the next stage of the shift register, and accordingly, the data will be transferred from stage to stage in this manner. Data present at the parallel entry gate will be gated into the master flip flop 604 whenever signal J is at ground potential. The duration of data entry gate signal I and J will be shown hereinafter with the description of the circuits that generate these signals.

Figure 8:
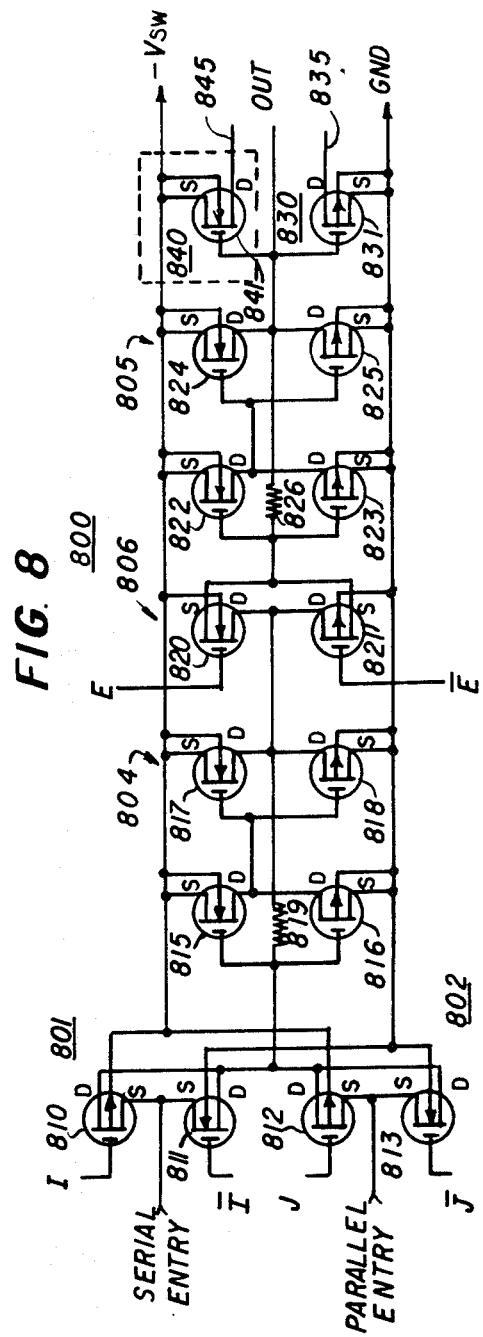
FIG. 8 is a schematic circuit diagram of the shift register stage of FIG. 6.

Referring to FIG. 8, there shown a circuit schematic of a preferred embodiment for the shift register stage 600 shown in FIG. 6. A complementary output symmetry metal oxide semiconductor (COSMOS) configuration is used for each shift register stage in order to minimize power requirements. The use of the complementary construction permits the shift register to operate from a 5 volt supply and yet dissipate less than 25 nanowatts per stage independent of the state being stored. Types 2N4351 and 2N4352, N and P type mosfets, respectively, are typical of field-effect devices suitable for this application.

The serial data entry gate 801 includes a N-type mosfet device 810 and a P-type mosfet device 811 having respective drain leads and source connected together. The data from the tone detector 358 is applied to the source leads of both transistor 810 and 811 via the data amplifier 385.

The controlling signal I is applied to the gate of transistor 810 and the signal $\bar{I}$ is applied to the gate of transistor 811.

Both the control signal I and its complement $\bar{I}$ are used because of the complementary configuration of the shift register stages. Similarly, the complement $\bar{E}$ of slave gate signal E and the complement $\bar{J}$ of the parallel data entry gate signal J are used to enable respective complementary devices of the slave gate 806 and the parallel entry gate 802.

The parallel data entry gate 802 is similar to the serial entry gate 801 and includes an N-type MOSFET device 812 and a P-type MOSFET device 813. Transistors 812 and 813 have their source leads and drain leads connected together. Control signals J and $\bar{J}$ are applied to the gates of transistors 812 and 813. The output from the serial entry gate 801 and the parallel entry gate 802 is taken from the drain leads of these transistors and extended to the gate leads of N and P type mosfet devices 815 and 816 of the master flip flop 804.

The source lead of transistor 815 is connected to −V; the source lead of transistor 816 is connected to ground; and the drain lead of transistor 815 is connected to the drain lead of transistor 816. The drain leads of transistors 815 and 816 are extended to the gate leads of the pair of complementary mosfet devices 817 and 818. The source of transistor 817 is connected to −Vsw; the source of transistor 818 is connected to ground; and the drain leads of transistors 817 and 818 are connected together. A resistor 819 connects the gates of transistors 815 and 816 to the drain leads of transistors 817 and 818. The output of the master flip flop 804, the drains of transistors 817 and 818, is connected to the drain leads of complementary mosfet devices 820 and 821 of the slave gate 806.

Signal E is applied to the gate of transistor 820 and control signal $\bar{E}$ is applied to the gate of transistor 821. The source leads of transistors 820 and 821 are connected together and extended to the gates of complementary mosfet devices 822 and 823 of the input stage of the slave flip flop 805. The source lead of transistor 822 is connected to −V; the source lead of transistor 823 is connected to ground; and the drain leads of transistors 822 and 823 are connected together and to the gates of complementary mosfet devices s 824 and 825 which form the output stage of the slave flip flop 805. A resistor 826 connects the gates of transistors 822 and 823 to the drain leads of transistors 824 and 825. The output of the shift register stage 800 is taken from the drain leads of transistors 824 and 825.

A code recognition stage 830 of the shift register 800 includes a mosfet device 831 connected between the output lead of the shift register 800 and the ground lead to provide an indication whenever a logic 1 bit is stored in the shift register stage 800.

Operation of Shift Register Stage

Figure 7:
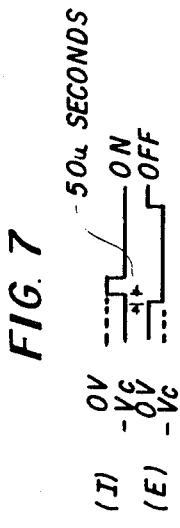
FIG. 7 is a timing diagram showing the relationship between gating signals for the shift register of FIG. 6.

Referring to FIG. 7, initially signal I is a −V potential and E signal is ground potential. Accordingly, referring to the circuit schematic for the shift register stage shown in FIG. 8, the serial entry gate 801 will be disabled due to the −V signal on the gate of transistor 810 and the ground signal on the gate of transistor 811. Thus, transistors 810 and 811 will be turned off. Prior to the entry of data into the master or slave flip flop stages, the states of flip flops 804 and 805 are undetermined. The slave flip flop gate 806 is enabled since signal E at the gate of transistor 820 is at ground potential and signal $\bar{E}$ at the gate of tran-sistor 821 is −V potential. Accordingly, transistors 820 and 821 are turned on. Since transistors 820 and 821 are on, the potential on the drain of transistors 820 and 821 appears at the source leads of transistors 820 and 821 and accordingly will be impressed upon the gates of transistors 822 and 823 at the input of the slave flip flop 805. To enter the data into the shift register stage 800, the slave gate 806 is first turned off by changing the level at point E from ground to −V and the potential at point $\bar{E}$ from −V to ground potential. This causes transistors 820 and 821 to be turned off.

Subsequently, when signal I becomes true, a ground is applied to the gate of transistor 810 and a −V potential is applied to the gate of transistor 811 turning these tran-sistors on so that the potential at the source leads of these transistors will also appear on the drain leads of the transistors. Assuming that a logic one is to be stored in the shift register, stage 800, the serial entry lead will be at ground potential so that the drain leads of transistors 810 and 811 which are turned on will also be at ground. This potential then appears at the gates of transistors 815 and 816 of the master flip flop 804 turning these transistors on.

The ground potential at the gate of transistor 815 turns transistor 815 on and the −V potential on its source lead is extended to its drain lead. Transistor 816 is turned off by the ground potential on its gate. The −V potential on the drain of transistor 815 is extended to the gates of transistor 817 and 818, and transistor 817 becomes turned off while transistor 818 is turned on and the ground on the source lead of transistor 818 is extended to its drain lead. Accordingly the output of the master flip flop stage 804 is a ground, or a logic 1 level.

At the end of the master clock pulse I, the ground pulse on the gate of transistor 810 will end, and transistor 810 will turn off so that the ground signal on the serial entry lead will no longer be extended to the drain leads of transistors 810 and 811. Transistor 815 is maintained in the on condition by the output of transistor 818 which is coupled to the gate of transistor 815 through resistor 819. Accordingly, the master flip flop will store the information that a logic one has been received from the detector circuit. When the control signal E at the gates of transistors 820 and 821 returns to ground level as shown in FIG. 7, transistors 820 and 821 will be turned on and the ground potential at the output of the master flip flop 804 will be extended from the drain leads of transistors 820 and 821 to the source leads of transistors 820 and 821 and to the gates of transistors 822 and 823 which comprise the input stage of the slave flip flop 805. Accordingly, transistor 822 will be turned on and transistor 823 will be turned off. When transistor 822 is turned on, the −V potential on its source lead is extended to its drain lead. The drain lead of transistor 822 is connected to the gate leads of transistors 824 and 825, causing transistor 825 to be turned on and its source lead potential of ground to be extended to its drain lead so that the output of the slave flip flop 805 is a ground or logic 1.

If the serial entry data bit was a logic 0, the −V applied to the source leads of transistors 810 and 811 would be extended to the gate leads of transistors 815 and 816 when pulse I was ground, and accordingly, transistor 815 would be turned off; transistor 816 would be turned on; and a ground potential from the source of transistor 816 would be extended to the gate leads of transistors 817 and 818. Transistor 817 would be turned on and transistor 818 would be turned off so that the −V potential on the source of transistor 817 would be extended to the drain of transistor 817, the output of the master flip flop stage 804. Similarly, a −V potential would be extended to the output of the slave flip flop stage of the shift register.

Shift Register Arrangement

Referring to FIG. 5, the 29 stage shift register 700 has been arranged in six sections A–F to simplify the discussion of the function of each stage of the shift register 700 in storing data. Sections A and B each include four shift register stages A-1 to A-4 and B-1 to B-4; sections C–E each include five stages C-1 to C-5, D-1 to D-5 and E-1 to E-5; and section F includes six stages F-1 to F-6. As will be shown, during bit times 0 to 28 the 29 data bits transmitted from the van are serially entered into the shift register and advanced from stage to stage until at bit time 28, the check bit is stored in stage F-6 and the seven digit meter identification number 1,805,769, each digit coded in four bit binary words, is stored in the remaining 28 stages with the last two digits 6 and 9 being stored in the sections B and A, respectively.

Shift Register Power Switch

A shift register power switch 388 is used to supply power to the data amplifier 385 and to the 29 stages of the shift register 700. Power is applied only when data is received by the transponder. This arrangement is used in order to minimize the power requirements of the transponder unit when the unit is not receiving or transmitting data. The shift register power switch 388 includes a mosfet device 390, such as a type 2N4352, having its gate connected to the output of amplifier 380 so that the signal E shown in line E of FIG. 2a is applied to the input of the power switch. Transistor 390 has its source connected to ground and its drain connected to −V through a resistor 391. A capacitor 392 is connected in parallel with resistor 391 between the drain of transistor 390 and −V. Transistor 390 is normally turned off.

The output stage of the shift register power switch 388 is comprised of an N-type mosfet device 395, such as a 2N4351, which has its gate connected to the drain of transistor 390 through cascaded amplifiers 393 and 394. The gate of transistor 395 is also connected to ground through a resistor 396 and a capacitor 397. The source of transistor 395 is connected to −V and the drain of transistor 395 is the output of the shift register power switch 388 and is extended to the power terminal of the data amplifier 385 of the shift register. Transistor 395 is normally turned off. The output print H of the power switch 388 is further extended to leads marked −VSW, for switched voltage, at each stage of the shift register 700.

When data is received point E at the output of amplifier 380 the potential at point E will go from ground to −V causing transistor 390 to turn on for the duration of the pulse shown in line E of FIG. 2a. When transistor 390 turns on, a ground potential is extended from the source to the drain of transistor 390 permitting capacitor 392 to charge to −V. This ground potential at the drain of transistor 390 is extended through amplifiers 393 and 394 to the gate of transistor 395 turning on transistor 395 and extending the switched voltage −VSW at the source of transistor 395 to the output, point H, of the shift register power switch and to the data amplifier 385 and the shift register 700.

The cascaded complementary amplifiers 393 and 394 act as a voltage comparator sensing the voltage charge on capacitor 392. At the end of each data pulse, point E will go to ground potential causing transistor 390 to be turned off. Capacitor 392 will begin to discharge. However, if the charge on capacitor 392 does not drop below approximately 50 per cent of its maximum charge value between data bits, transistor 395 will be maintained in saturation so that the potential −V remains extended to the data amplifier and the shift register. When the data train is interrupted for over 50 milliseconds, or approximately 3 data bits, capacitor 392 will have discharge sufficiently to allow transistor 395 to be turned off.

Shift Register Gating Pulses

The transponder circuit includes gating or clocking pulse generating circuits for generating pulses for gating data into and through the stages of the shift register 700. Pulses shown in FIG. 4 at point I and J are used to energize the serial or parallel data entry gates respectively, and the pulses appearing at point E are used to gate the data from the input stage or master flip flop, such as flip flop 604 of the shift register stage 600 shown in FIG. 6, to the output stage or slave flip flop, such as flip flop 605 of stage 600.

Signal E is obtained by summing the outputs of the tone detectors 357 and 358, lines C and D of FIG. 2a. The slave flip flop gate signals E shown in line E of FIG. 2a, are provided at the output of amplifier 380. The output of amplifier 380 is in turn connected to an inverting amplifier 441 which inverts the signals E providing signals $\bar{E}$. The complementary slave gate signals are required because of the complementary symmetry construction of the shift register 700. Signals E and $\bar{E}$ are extended to the slave flip flops of the shift register 700 via individual conductors of cables 701–707.

The serial and parallel data entry gate clock pulse I and J and their complements $\bar{I}$ and $\bar{J}$ are generated by a pair of integrating circuits 444 and 445 and a gate circuit 446 and routed to either the serial or the parallel data entry gates of the shift register 700 by a switch circuit 447.

The output of amplifier 380 is coupled to an integrating circuit 444 which includes a noninverting amplifier 451 through a resistor 450. A capacitor 452 is connected from the input to the output of amplifier 451 to provide the time delay associated with the integrating circuit 444.

Referring to FIG. 2b, an enlarged timing diagram showing bit times 36 to 30 it can be seen that the output point F, of amplifier 451, line F, is delayed slightly from the output of amplifier 380, line E.

The output of integrating amplifier 451 is coupled to a second similar integrating circuit 445 which includes an amplifier 454 a resistor 453 connected between the output of amplifier 451 and the input of amplifier 454, and a timing capacitor 455 connected from input to output of amplifier 454. The output point G, of amplifier 454, is shown in line G of FIG. 2b to be delayed from the output at point F of amplifier 451 and further delayed from the output at point e of amplifier 380.

The outputs at points F and G of integrating circuits 444 and 445 are extended to a gate circuit 446 which generates a pulse at its output labeled point K. Gate circuit 446 includes a first pair of complementary mosfet devices 460 and 461, such as types 2N4351 and 2N4352. The gate of transistor 460 is connected to gate of transistor 461 and the drain of transistor 460 is connected to the drain of transistor 461. The gates of transistors 460 and 461 are connected to the output, point G, of amplifier 454. The source lead of transistor 460 is connected to the output, point F, of amplifier 451.

The output stage of gate 446 includes a second pair of complementary mosfet devices 464 and 465 which are the same types used in the input stage of the circuit. The drain leads of transistors 464 and 465 are connected together and the gates of transistors 464 and 465 are connected together at point K. The drain of transistors 460 and 461 are connected to the gates of transistors 464 and 465. A resistor 466 is connected from the gates of 464 and 465 to ground. The source of transistor 465 is connected to ground, and the source of transistor 464 is connected to −V.

Operation of Gate Circuit

When no data pulses are being received by the transponder, points E F and G are at ground potential as shown in FIG. 2b. Transistor 464 is normally on and transistors 460, 461 and 465 are normally off. Since the transistor 464 is on, the −V connected to its source lead is present on its drain lead and at the output, point K, of the gate circuit.

When, in response to a data signal, the potential at point F becomes −V, transistor 460 will turn on extending the −V potential to the drain of the transistor 460 and to the base of transistor 464, turning transistor 464 off. The −V potential also appears at the base of transistor 465 turning transistor 465 on, and the ground at the source lead of transistor 465 will appear at the output point K of the gate circuit as shown in FIG. 2b, line K. When the output, point G of amplifier 454 becomes −V, transistor 460 will be turned off and transistor 461 will be turned on so that the ground on the source lead of transistor 461 will appear at the drain of transistor 461 and at the gates of transistors 464 and 465, causing transistor 464 on turn on again and transistor 465 to be turned off. Accordingly, the −V potential on the source of transistor 464 will appear at the drain of transistor 464 and the output point K of the gate circuit will again become −V potential. It is pointed out that the duration of the pulse I is determined by the delay between the appearance of pulses F and G as shown in FIG. 2b, lines F and G, respectively.

Master Clock Switch

The signal at point K at the output of the gate circuit 446 is passed to the serial entry gates or the parallel entry gates of the shift register 700 via a switch circuit 447, at appropriate times. The switch 447 includes a first pair of complementary mosfet devices 470 and 471 having their drain leads connected together and their source leads connected together. Type 2N4351 and 2N4352 field-effect transistors are typical of devices suitable for this application. The switch further includes a second pair of complementary mosfet devices 472 and 473 which also have their drain leads connected together and their source leads connected together. The source leads of all the transistors 470–473 are connected together to the output of the gate circuit 446. The gates of transistors 471 and 472 are connected together and to the gate of an N-type mosfet 475, such as a 2N4351. The source of transistor 475 is connected to −V and the drain is connected to the drain of transistors 470–471 and provides one output labelled point J of the switch circuit 447. The gates of transistors 470 and 473 are connected together and to the gate of a transistor of an N-type mosfet device 476 which is similar to transistor 475. Device 476 has its source connected to −V and its drain connected to the drains of transistors 472 and 473 and provides another output labelled point I of the switch circuit 447. When data is not being received, transistors 472, 473, and 475 are normally on and transistors 470, 471 and 476 are normally turned off.

Since transistor 475 is normally on, its source being connected to −V, the drain of transistor 475 reflects the −V potential and accordingly, point J is held at −V potential.

It is pointed out that an output L, shown in FIG. 2b line L, of a code recognition circuit 448 is connected to the gate of transistor 475. Output L is normally ground potential accordingly, transistor 475 is normally turned on. The voltage at point L is inverted through an amplifier 501 of the code recognition circuit 448 and this inverted output is applied as a −V potential to the gate of transistor 476 biasing this transistor off.

When data is not being received, the potential at output of the gate circuit 446 point K is −V. This potential is extended from the source to drain of transistor 472 to the output, point I, of the switch circuit 447. When data is received, potential at point I goes to ground under the control of integrating circuits 444 and 445. This ground is extended from source to drain of transistor 472 to point I, at the output of the switch 447. Accordingly, point I will follow point K.

The signal at the output point I of the switch circuit 447 is inverted by an amplifier 480 to provide a signal Ī. Signals I and Ī are extended to the serial entry gates of each stage of the shift register via individual conductors of cables 701–707 to the serial data entry gates of the register 700.

Referring to FIG. 2a, line E and I, it is seen that both a slave gate pulse E and a master gate pulse I are generated during each of the bit times 0 to 28, for entering the data into the shift register and for advancing the data from stage to stage. Only the signal shown in line C of FIG. 2a, provided in response to the detection of logic 1 signals are passed to the shift register. The manner in which the data are entered into a stage of the register and advanced to the subsequent stage has already been described with reference to the shift register stage 800 shown in FIG. 8.

Thus, during bit time 0, a logic 1 will be stored in the first stage, A-1 of the shift register. During bit time 1, the logic 1 stored in stage A-1 will be shifted to the second stage A-2 and the second data pulse, a logic 0 will be stored in stage A-1.

The consecutive data bits from bit time 0 to bit time 28 will be serially entered into the shift register until the 29th stage F-6 of shift register 700 stores the logic 1 control tone and the seven digit meter identification number each encoded in a four bit binary word are stored in the remaining 28 stages of the shift register 700 with the last two digits, 6 and 9 being stored in sections stages B-1 to B-4 and A-1 to A-4, respectively, of the shift register 700.

Code Recognition Gates

Each stage, such as stage 600 shown in FIG. 6, of the 29 stage shift register 700 includes a code recognition gate, such as gate 630 shown schematically in FIG. 6. Gate 630 is a logic 1 code recognition gate and will provide an output indicating a logic 1 is stored in shift register stage 600. Alternately, a logic 0 code recognition gate, such as gate 640, could be connected to the output of stage 600 to indicate a stored logic 0. Each shift register stage will include either a logic 0 code recognition gate or a logic 1 code recognition gate. The "-wired-digit" coding provided by the combination of code recognition gates for the shift register of each meter transponder will form the basis for a comparison between the data bits stored in each stage of the shift register and binary coded data which represent the identification number of the meter.

It is the code recognition gates operative with the code recognition gate output combiner circuit 448 which determine which meter is being addressed since only one meter will have the proper coding of the code recognition gates for each shift register stage to provide a "recognition" or true output signal when the 29 data bits transmitted from the van are stored in the shift register stages.

As will be described hereinafter, in response to the generation of the "recognition" signal, the master clock pulse switch circuit 447 will be operated to pass the signal at point K to the parallel data entry gates of each stage of the shift register to permit coded signals which represent the meter reading at the outputs of code generating circuits 412–415 shown in FIG. 5, associated with the meter register to be gated into the shift register. In addition, the transmitting portion of the transponder will be enabled to permit the transmission of the stored data back to the van.

Referring to FIG. 8, the shift register stage 800 shown therein includes a stored logic 1 code recognition gate 830 for the shift register stage 800. The code recognition gate includes a mosfet device 831 having its gate connected to the output of the shift register stage and its source connected to ground. The mosfet is a P-type device such as a 2N4352. The output of the gate circuit 830 shown as a conductor 835 is taken from the drain of transistor 831.

When the shift register stage 800 stores a logic 1, the output of the shift register stage will be at ground potential, and transistor 831 will be turned off. Consequently, the potential at the drain of transistor 831 will be determined by a code recognition gate output combiner circuit 448 as will be shown. Conversely, whenever the stage 800 stores a logic 0, transistor 831 will be turned on, and the drain of transistor 831, and the conductor 835 connected thereto, will be grounded.

To provide an indication that stage 800 is storing a logic 0 rather than a logic 1, a stored logic 0 code recognition gate 840 would be connected to the output of the shift register stage rather than code recognition gate 830. Code recognition gate 840 includes an N-type mosfet such as a 2N4351 having its source connected to −V and its gate connected to the output of the shift register stage. A conductor 845 is connected to the output of gate circuit 840 at the drain of transistor 841.

When the shift register stage 800 stores a logic 0, the output of the shift register stage will be at −V potential and transistor 841 will be turned off. Consequently, the drain of transistor 841 will be determined by the code recognition circuit 448. If the stage were storing a logic 1, transistor 841 would be turned on and the drain of transistor 841 and a conductor 845 connected thereto would be at −V potential. For example, stages A-4 to A-1 of the shift register 700 will store bits 1001, respectively which represent the binary coding of nine, the last digit of the meter identification number which is stored in stages A-4 to A-1, with the most significant digit, which is received first, stored in stage A-4.

Code Recognition Gate Combiner Circuit

Figure 4:
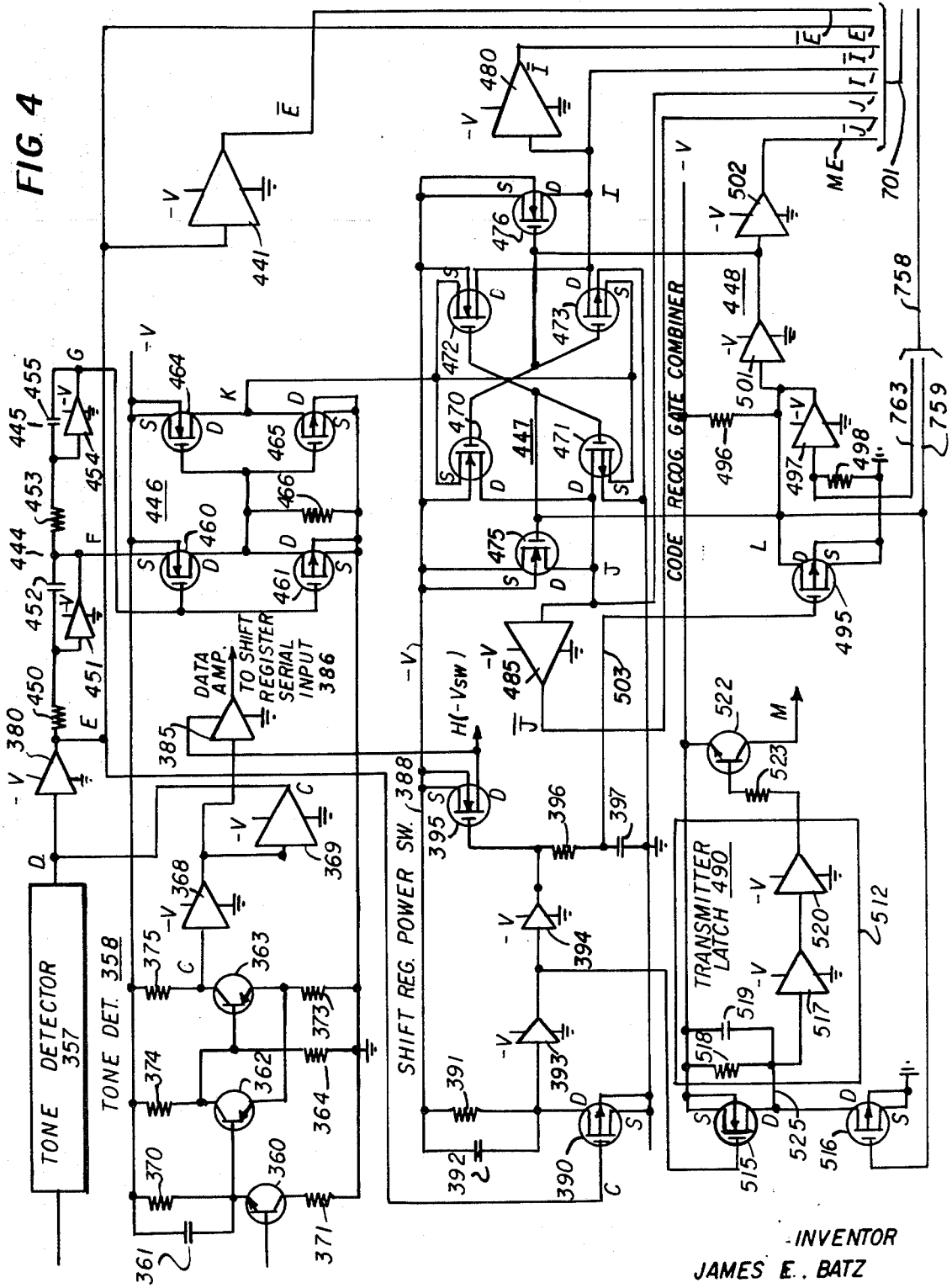

The outputs 755 and 756 of logic 1 code recognition gates of stages A-1 and A-4 are connected to a conductor 757 and via a cable 758 and conductor 759 are extended to a point L of the code recognition gate combiner circuit 448, FIG. 4. Point L is also connected to −V potential through a resistor 496.

The outputs 761 and 762 of logic 0 code recognition gates of stages A-2 and A-3 are connected to a conductor 760 and are extended via cable 758 and a conductor 763 to the input of an inverter 497. The input of the inverter 497 is connected to ground through a resistor 498. The output of the inverter 497 is connected to point L.

The outputs of the logic 1 or logic 0 code recognition gates of each of the remaining stages of the shift register 700 are also extended to one of the input points of the code recognition gate combiner circuit 448 via one of the conductor 765–773, cable 758, and conductors 759 or 763.

The code recognition gate output combiner circuit 448 includes a P-type mosfet device 495 such as an 2N4352, which has its gate connected to an output of the shift register power switch 388 via lead 503, its source connected to ground, and its drain connected to point L. An amplifier 501 has its input connected to point L and its output connected to the gate of transistor 476 of switch circuit 447.

When data is not being received and the shift register power switch 388 is off; transistor 495, which has its gate connected to the output of the power switch, is turned on; and a ground potential at the source of transistor 495 is extended to the drain of the transistor and point L, clamping point L at ground potential.

Whenever the shift register power switch 388 is turned on, the ground potential extended to the gate of transistor 495 via lead 503 causes transistor 495 to be turned off. Accordingly, the ground at the source lead of transistor 495 is removed from point L.

The ground at point L maintains transistor 475 turned on, and through inverter 501, maintains transistor 476 turned off. Transistor 475, when turned on, clamps point J, which provides the parallel data entry gate pulse, to −V to disable the parallel entry gates of all stages of the shift register. Transistor 476, when turned off, is ineffective to control point I, to which the serial data entry pulses are passed. Thus, point I follows point K and, as shown in line I of FIG. 2a, a pulse is provided for each of the bit times 0 to 28.

Referring for a moment to FIG. 8, the transistor 831 of the logic 1 code recognition gate 830 will be turned off whenever a logic 1 is stored in the shift register stage 800, and the potential on lead 835 will be the same as the potential at point L of the combiner circuit 448, being determined either by a ground presented by a different logic 1 recognition gate associated with a stage storing logic 0, or by the −V potential through resistor 496 whenever code recognition is obtained for all stages of the shift register.

When a logic 0 is stored in the shift register stage 800, transistor 831 is turned on and lead 835 is grounded. This ground is extended to point L of the recognition gate output combiner circuit 448 to hold point L at ground. Similarly, for each stored logic 0 code recognition gate, a −V potential is provided whenever a logic 1 is stored in the associated shift register stage.

Only the meter addressed by the van (through the transmission of the identification number for the particular meter) will store data bits in the transponder shift register which correspond to coding of all of the code recognition gates. In every other meter transponder either conductor 759 and/or conductor 763, which are connected to the outputs of the corresponding code recognition gates, will be at a potential which will be ineffective to change the potential at point L of the code recognition circuit 448.

When the 29 data bits transmitted from the van during bit times 0 to 28 have been received by transponder 40 and stored in the shift register 700, code recognition will be achieved in the 29 stages of the shift register since the code recognition gate of each stage will be turned off. The −V potential is passed to point L through resistor 496 and point L drops to −V potential as shown in FIG. 2b line L. The input of inverter 497 is approximately at ground potential (through resistor 498), and the output of inverter 497 is −V potential.

This shift in the potential at point L, which controls the master clock pulse switch circuit 447, reverses the polarity at the gates of transistors 472, 473 and 475, turning them off and transistors 470, 471 and 472 are turned on.

With the master clock pulse switch circuit 447 in this condition, the pulse at point K at the output of the pulse gate circuit 446 will traverse a path which includes the source to drain circuits of transistors 470 and 471 to point J providing the clock pulse shown in line J of FIGS. 2a 14 2c. The signal at point J is inverted by amplifier 485 providing the complement $\bar{J}$ of the signal. Outputs J and $\bar{J}$ are extended to the stages of the shift register via individual conductors of cables 701–707.

When the parallel entry gates of the shift register stages are enabled, the outputs of the code generator circuits 412–415 which provide outputs representing the meter reading are entered into shift register 700. The meter reading data is entered into master flip flop of corresponding stages of the shift register while the pulse J is at ground level. The data will be shifted to the slave flip flop stages of the shift register when signal E, line E, returns to ground level. At this time the code recognition is destroyed, and the code recognition gate output combiner circuit 448 provides a false indication (no output) as shown in FIG. 2b, line L, permitting the switch circuit 447 to revert to its normal state and the clock pulses from the gate circuit 446 are passed to point I to the serial entry gates of the shift register stages.

Meter Reading Code Generation

Information relating the reading of the meter, as indicated by the angular position of the dial of the meter register, is converted into a data form usable by the transponder through the use of code generation circuits 412–415, shown in FIG. 5, which include meter encoding discs 408–411, respectively.

Each code generation circuit, such as circuit 412, provides five data bits which represent the coding of 10 units, 0 through 9, associated with the angular position of a meter register dial. In the example shown, four meter encoding circuits 412–415 provide coded information relating the readings of four dials which represent one thousand, ten thousand, one hundred thousand and one million units, respectively of a commodity used.

Figures 9, 10:
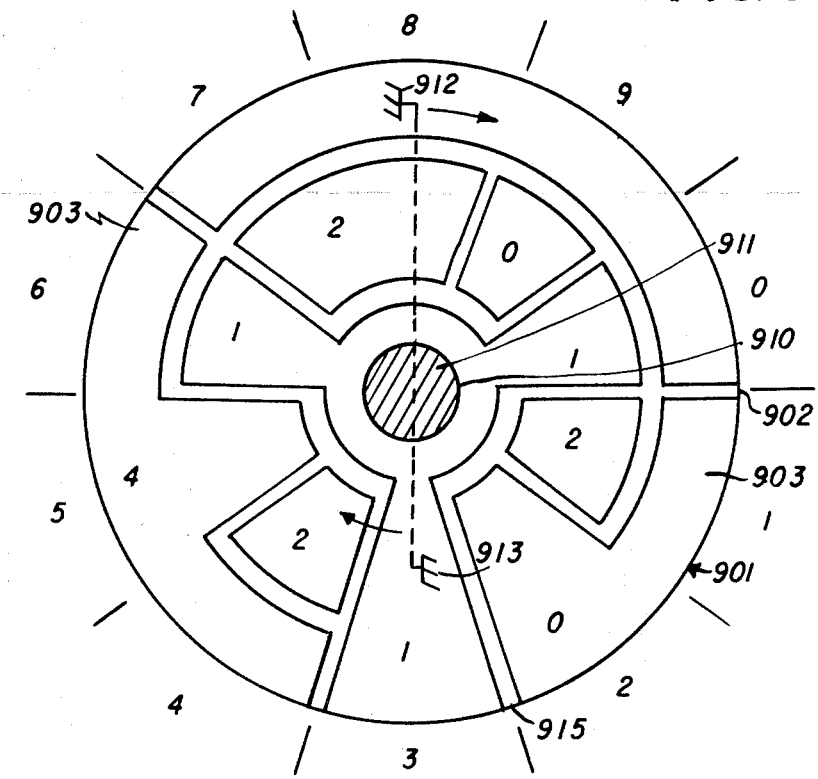
FIG. 9 is a schematic showing of a meter encoding disc for use with the present invention.
FIG. 10 is a table showing a two out of five code provided by the encoding disc shown in FIG. 9.

Referring to FIG. 9, there is shown a schematic representation of a meter wheel encoding disc 901 for converting the angular position of a meter register dial into data bits in a two-out-of-five code.

The encoding disc 901 comprises a substrate 902 of a rigid insulating material having conductive material 903 disposed thereon in segments. The segments may be printed on the disc using techniques known in the art of printed circuits in such a way as to form the segmented areas of conductive material generally arranged in an inner and an outer ring.

The encoding disc 901 is positioned over a meter register indicator dial and the center 910 of the disc 901 is located over the shaft 911 of the meter dial indicator. A commutator brush 912 shown schematically in FIG. 9, is cantilever mounted on the shaft 911 and rotatably movable therewith contacts the segments which comprise the outer ring. A second commutator brush 913 also mounted on the shaft 911 and rotatably movabletherewith contacts the inner segments printed on the disc.

The digits 0–9 are shown spaced circumferentially about the disc to represent a unit of the commodity used as measured by the meter. With each unit of the commodity measured the shaft 911 and the commutator brushes 912 and 913 carried thereby will be rotated through thirty-six degrees. The brushes 912 and 913 are positioned 180° apart and each contacts the disc 901 at a different radius thereof to selectively engage a different segment in accordance with the angular positions of the brushes. Adjacent conductive segments 903 on the disc 901 are separated from one another by insulating areas 915 formed by removing portions of the conductive material 903.

The segments 903 which are numbered 0, 1, 2, 4, and 7, are disposed on the disc to permit a coding digits zero to nine shown in table of FIG. 10, to be established by interconnecting different pairs of the segments 0, 1, 2, 4, and 7 to establish a two-out-of-five coding for each digit. Thus, for example, the number one is represented by interconnecting segments 0 and 1; the number 2 is represented by interconnecting segments, 0 and 2; etc., as shown in the table of FIG. 10.

When the shaft 911 is grounded, the ground is extended via the brushes 912 and 913 to the segments, such as segments 7 and 1 when the shaft is in the angular position shown in FIG. 9. Accordingly, segments 7 and 1 are grounded corresponding to the digit 8, FIG. 10, to indicate that eight units of the commodity have been used.

The code generating circuits 412–415, shown in FIG. 5, include discs 408–411, respectively which are similar to disc 901 and adapted to provide a logic 1 or ground levels on two out of five outputs and a logic 0 levels on the other three outputs.

Referring to FIG. 5, each of the four code generating circuits 412–415, such as circuit 412, provides five outputs 420–424. Each of the outputs 420–424 is connected to −V potential through a respective resistor 425–429. In accordance with the angular position of the shaft of the meter register, two of the five leads 420–424, such as leads 422 and 424, are grounded in the manner described above with reference to the grounding of segments of the disc 901 in FIG. 9. The cooperative of the commutator brushes, such as brushes 912 and 913, shown in FIG. 9, with the disc segments 0,1,2,4 and 7, is shown schematically in FIG. 5 as a set of contacts 430-434 connected to leads 420-424, respectively.

In the embodiment described, the ground is extended to the shaft 911 and hence to the commutator brushes 912 and 913 only when code recognition has been achieved. The ground is provided by an amplifier 502, shown in FIG. 4 connected to the output of amplifier 501 of the code recognition gate combiner circuit. The output lead ME of amplifier 502 will be grounded whenever code recognition is obtained. Lead ME is extended to the meter encoding disc circuits 412-415 via cable 701. Alternately, lead ME could be grounded so that encoded outputs would be provided continuously.

Each contact 430-434, when closed, extends a ground to the lead connected to the contact. Thus leads 422 and 424 will be at ground potential or a logic 1 level since contacts 432 and 434 are closed, and leads 420, 421 and 423 will be at a -V potential or a logic 0 level. Similarly, code generation circuits 413-415 provide outputs which represent the reading of a dial of the meter register.

It is assumed for this example that the meter reading 8,579,000. Only the first four digits 8, 5, 7 and 9 are entered into the shift register and subsequently transmitted to the van.

The coding of the meter reading is provided by discs 408-411. Outputs 1 and 7 of code generator circuit 415 will be grounded by disc 411; outputs 1 and 4 of code generator circuit 414 are grounded by disc 410; outputs 0 and 7 of code generator circuit 413 are grounded by disc 409; and outputs 2 and 7 of code generator circuit 412 are grounded by coding disc 408.

The five outputs 420-424 of code generator circuit 412 are extended to the parallel input gates of section C of the shift register 700 via a cable 740 and leads 741-745. Similarly, the five outputs 435, 436, and 437 of code generation circuits 413-415 are connected to parallel data entry gates of sections D through F of the shift register 700 via cables 775-777 and respective conductors 778-782, 783-787 and 788-792.

Signals, in a two out of five code that represent the meter reading will be present at the outputs of code generating circuits 412-415 when the code recognition signal is present. When the code recognition signal is generated, that is, when the voltage level at point L shifts from ground to -V potential, the parallel data entry gates are enabled by signal J and J̄ and the five bit words provided by the code generating circuits 412-415 are entered into sections C1-C5 to F1-F5, respectively of the shift register in the manner described in the foregoing with reference to the entry of data into shift register stage 800 shown in FIG. 8.

Consequently stages C3 and C5; D1 and D5; E2 and E4; and F2 and F5 will store logic 1 levels, and stages C1, C2, C4; D2—D4; E1, E3 and E5; and F1, F3 and F4 will store logic 0 levels.

The data for the four code generating circuits 412-416 is entered in parallel into the five stages of each of the shift registers sections C-F simultaneously. It is pointed out that no meter data is read into sections A and B and stage F-6 of the shift register 700. Accordingly, the four stages A1 to A4 of section A and B1 to B4 of section B will retain the binary coding of the last two digits 6 and 9 of the meter identification number, that is stored in these stages and stage F6 of section F will retain the logic 1 check digit.

When the code recognition is destroyed upon transfer of the meter reading data from the meter register into the slave flip flops of the shift register stages, the switch circuit 447 will revert to its normal state as the potential at point L shifts from -V to ground as shown in FIG. 2b.

Transmitter Latch Circuit

The transmitting portion of the transponder including the locked oscillator 510 and the quenching modulator 511 are enabled to transmit data back to the van through the operation of the transmitter latch circuit 490 which in turn is energized only when the shift register power switch 388 is turned on and the code recognition gate output combiner circuit 448 indicates parity between the "wired bits" in the shift register 700 and the contents of each stage of the shift register.

The transmitter latch circuit 490 includes a first input gating transistor 515, such as a 2N4351 mosfet having its gate connected to the output of amplifier 393 of the shift register power switch 388, and its source connected to -V. The drain of the transistor 515 is connected to the drain of a second input gating mosfet device 516, such as a type 2N4352, which has its gate connected to lead 759 at the output of the logic 1 code recognition gates, and its source connected to ground. The drain leads of transistors of 515 and 516 are connected to the input of an amplifier 517. The input of the amplifier 517 is connected to -V through a resistor 518. A capacitor 519 is connected in parallel with resistor 518. The output of amplifier 517 is connected to the input of a second amplifier 520. The output of amplifier 520 is connected to the base of a bi-polar transistor 522 through a resistor 523. The emitter of transistor 522 is connected to -V and the collector of transistor 522, which is labeled point M, comprises the transmitter turn on point and is connected to supply power to the locked oscillator 510.

Operation of Transmitter Latch

Transistor 515 is normally on, and accordingly, point 525 is normally maintained at -V potential. Capacitor 519 is thus discharged and transistor 522 is cutoff. When the shift register power switch 388 is enabled, the output of amplifier 393 being at -V potential, transistor 515 will be turned off. Point 525 is maintained at approximately -V through resistor 518.

When code recognition is obtained, the -V potential on lead 759 will cause transistor 516 to turn on passing the ground potential from the source of transistor 516 to point 525 and to the drain of transistor 516 connected thereto. Capacitor 519 will charge to the potential -V, and the ground presented the input of amplifier 517 which is connected in cascade with amplifier 520 will cause transistor 522 to turn on and the -V potential will be conducted from the emitter to the collector, point M of transistor 522 as shown in line M of FIG. 2b, and to the emitter of transistor 550 of the locked oscillator 510 through resistor 557.

The transmitter latch circuit 490 operates in a manner similar to the shift register power switch 388. Capacitor 519 maintains the transmitter latch circuit in the turned on condition after the code recognition signal has returned to ground potential when parity is destroyed as the meter data is read into the shift register. The transmitter latch circuit will remain operated for approximately 500 milliseconds after the code recognition signal returns to ground. This is sufficient time to assure the transmission back to the van of the data stored in the shift register.

If the shift register power switch should be turned off due to failure to recognize data bits for a period of a three data bit duration, transistor 515 will turn on and a −V potential at point 525 will cause capacitor 519 to be discharged rapidly and the transmitter latch circuit 490 will turn off in less than the prescribed 500 milliseconds.

Quenching Modulator Circuit

Figure 3:
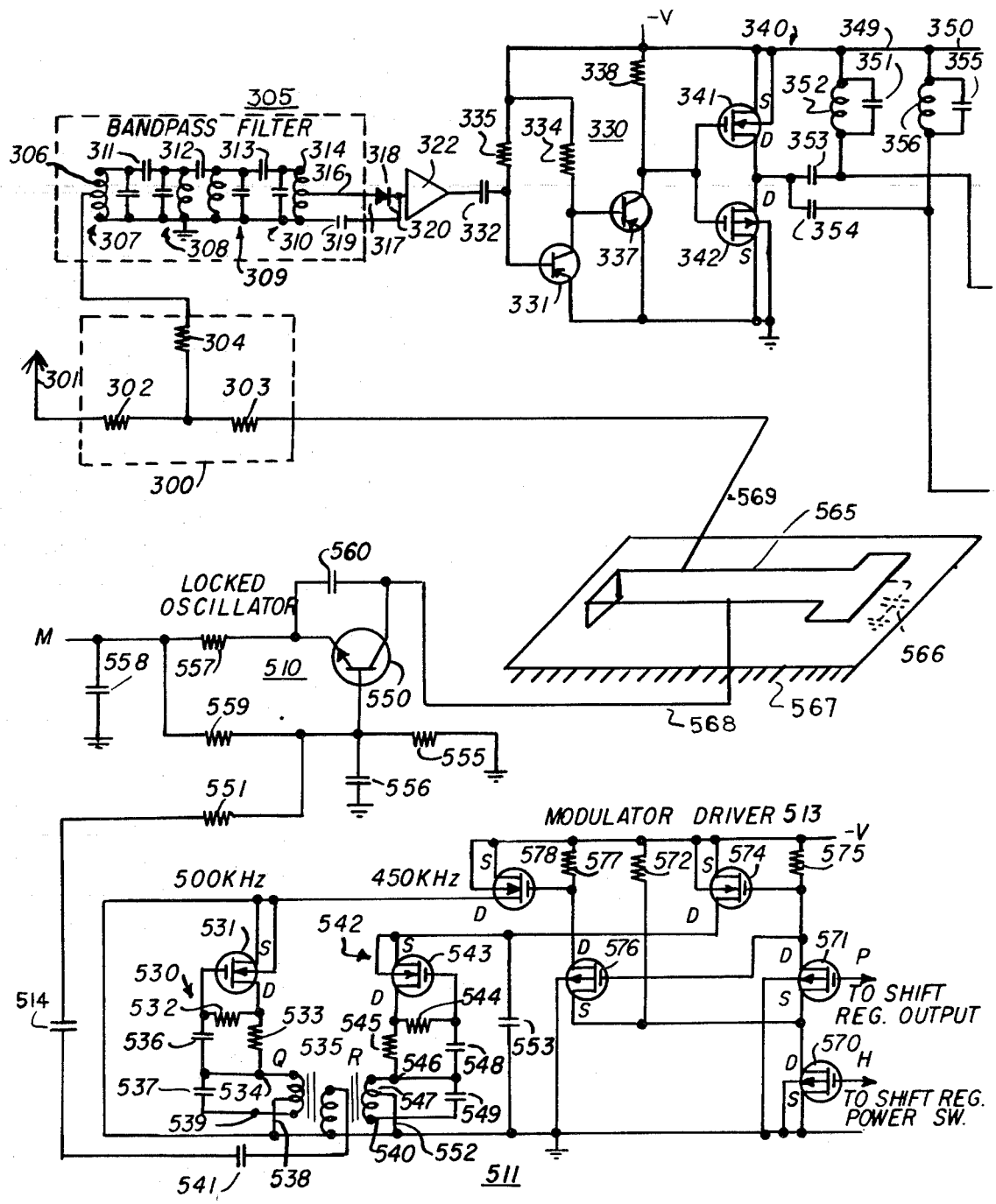
FIGS. 3–5 put together as shown in FIG. 13 are a schematic circuit diagram of the transponder unit shown in FIG. 1b.

The transmitter latch circuit 490 extends a D.C. potential −V to the emitter of transistor 550 of the locked oscillator 510, shown in FIG. 3. The transistor receives base drive from the quenching modulator circuit 511 shown in FIG. 3. The quenching modulator circuit 511 is controlled by the shift register outputs, logic 0 or logic 1 levels, to provide bursts of 450 kHz or 500 kHz frequencies, representing respectively, logic 0 or logic 1 data bits to be transmitted.

The quenching modulator 511 includes oscillators 530 and 542 which provide the two frequencies, and a driver circuit 513 controlled by the shift register outputs to selectively energize either oscillator 530 or oscillator 542.

The oscillator circuit 530 includes a mosfet device 531, such as a type 2N4351. A resistor 532 is connected between the gate of transistor 531 and the drain of transistor 531. A resistor 533 connects the drain of transistor 531 to a terminal 534 of a transformer 535. A capacitor 536 connects the gate of transistor 531 to terminal 534 of the transformer 535. A capacitor 537 is connected from terminal 534 to another terminal 539 of the transformer 535. Transformer 535 has a center tap 538 which is connected to ground. The source of transistor 531 is connected to an output of the driveportion 513 of the quenching modulator 511. A capacitor 514 is connected from the source of transistor 531 to ground.

Oscillator 530 generates a 500 kHz signal when energized. The 500 kHz signal, representative of a logic 1 is coupled through a secondary of transformer 535, a capacitor 541 and a resistor 551 to the base of the transistor 550 of the locked oscillator circuit 510.

The modulating oscillator circuit 542 includes a mosfet device 543, also a type 2N4351. A resistor 544 is connected between the gate and drain leads of transistor 543. A resistor 545 connects the drain of transistor 543 to a terminal 546 of a winding 547 of transformer 535. Transformer winding 547 has a center tap 552 connected to ground. A capacitor 548 connects the gate of transistor 543 to terminal 546 of transformer winding 547. A capacitor 549 is connected from terminal 546 to terminal 540 of winding 547. A capacitor 553 is connected from the source of transistor 543 to ground.

The oscillator 542 generates a 450 kHz signal representative of a logic 0 when energized. The output of oscillator 542 is coupled to the base of transistor 550 through the secondary winding of transformer 535, capacitor 541, and resistor 551.

It is apparent that other frequency values could be selected for the quenching modulator output signals.

Locked Oscillator

Transistor 550 of the locked oscillator 510 has its base connected to ground through a resistor 555. A capacitor 556 is connected in parallel with resistor 555. The emitter of transistor 550 is connected through a resistor 557 to the output point M of the transmitter latch circuit at the collector of transistor 522 FIG. 4. A capacitor 558 is connected from point M to ground. A resistor 559 is connected from point M to the base of transistor 550. A capacitor 560 is connected across the base to emitter of transistor 550. The collector of transistor 550 is connected to a quarter-wavelength stub 565 of a stripline section which includes lumped capacitances indicated as 566 to provide a parallel resonant circuit 567 for the oscillator. The stripline section provides a broadly tuned LC circuit 567 having a center frequency of approximately 450 mHz.

The quarter wavelength stub 565 has two taps 568 and 569 positioned so that the tuned circuit 567 provides a Q of approximately 50. One tap 568 of the stub 565 is connected to the collector of transistor 550, and the other 569 is connected to resistor 303 of the attenuation pad which couples the output of the locked oscillator 510 to the antenna 301. A medium Q is preferrable for the tuned circuit 567 since a high Q tuned circuit would cause a decrease in the output power of the locked oscillator circuit, and a tuned circuit having a low Q may not provide the desired operating characteristics for the circuit 510.

The locked oscillator circuit 510, controlled by the quenching modulator 511, acts somewhat as a super-regenerative receiver, but is used as a transmitting source. The oscillator 510 receives the readout signals transmitted from the van and coupled to the tuned circuit 567 via the attenuation pad 300 and is controlled by signals provided by the quenching modulator 511 to modify the received signals and retransmit the signals back to the van.

When the transmitter latch circuit is enabled, a −V potential is applied to point M and coupled by resistor 557 to the emitter of transistor 550 and by resistor 559 to the base of transistor 550 biasing the transistor in a low gain region. As the base drive to the transistor 550 is increased due to the output of the quenching modulator 511, the transistor is swung through a region of high amplification and then into uncontrolled oscillation. Referring to FIG. 11b, there is shown one cycle of a signal output provided by one of the quenching modulator oscillator circuits 530 and 542. At the start of the cycle, in the region marked "low gain", transistor 550 is biased as a low gain amplifier to amplify signals coupled by capacitor 560 to the emitter of transistor 550 from the tuned circuit 567. In this region, the biasing of the transistor 550 is insufficient to provide locked oscillator operation.

As the amplitude of the quenching signal increases the transistor 550 is biased into the region marked "-high gain" to function as a high gain regenerative amplifier. During this time, the locked oscillator circuit 510 "locks" to the readout signals transmitted from the van and coupled to the tuned circuit 567, and generates a plurality of sideband signals, such as shown in FIG. 11a, separated from the carrier frequency 450 mHz of the readout signals by an amount, either 450 kHz or 500 kHz, determined by the quenching drive modulator.

As the quenching signal continues to increase in magnitude, the transistor is biased into the region of uncontrollable oscillation until the drive signal has decreased to a level sufficient to turn off the transistor 550.

It is evident that the region of interest is the region of high amplification and that it would be possible to bias the transistor at a point in this range to achieve the desired effect. However under such conditions, a shift in the bias point of the transistor 550, caused for instance by a change in temperature at the transponder, could render the oscillator 510 self-oscillating and thus ineffective to retransmit the received carrier. Accordingly, the transistor 550 is intentionally swung through the region of high amplification to oscillation by the use of the variable base drive described above and is then cutoff for each cycle of the quenching signal to assure control of the transmitting circuit.

Referring to FIG. 11a, the sideband signals generated by the locked oscillator 510 are spaced from the interrogating carrier signal by increments of either 450 kHz or 500 kHz depending on the energization of the quenching modulator. As shown in FIG. 11a, the intelligence (the 3 kHz signal carried by the 450 mHz carrier) is transferred to each of the sidebands as a result of the operation of the locked oscillator circuit.

The sideband signals generated by the locked oscillator 510 and appearing across the tuned circuit 567 at the oscillator output are coupled to the antenna 301 of the transponder via resistors 302 and 303 for transmission to the van, and are also coupled via resistor 303 and 304 to the bandpass filter 305 at the input of the receiving portion of the transponder. The signals generated by the locked oscillator combine with the readout signals being received, reinforcing these signals and accordingly increasing the magnitude of the signals which are detected by the detector 318 of the transponder.

Since the carrier and the intelligence carried thereby generated at the van are used both to effect the readout of each data bit from the transponder and provide the transmission media for the data, the synchronization of the system and the frequency stability of the system are largely controlled by the van. The effects of the tuning of the tuned circuit 567 or of changes in the transistor 550 affect only the amplitudes of the sideband signals generated. The modulating frequencies of 450 kHz or 500 kHz are approximately one thousandth the frequency of the 450 mHz carrier signal used, and accordingly a 0.5 percent change in the quenching modulator frequency would cause a corresponding change in the transmitted sidebands of approximately 0.005 percent.

Modulator Driver

The variable base drive for the transistor 550 is provided by the quenching modulator circuit 511. The frequency of the modulating signal applied to the base of transistor 550 is determined by the modulator driver which is responsive to the data output from the shift register to selectively energize either oscillator 530 or oscillator 542 of the quenching modulator circuit 511. Accordingly, the base drive to transistor 550 of the locked oscillator circuit 510 will be either a 500 kHz signal when a logic 1 is present at the output of the shift register or a 450 kHz signal when a logic 0 is present at the output of the shift register.

The modulator driver 513 includes a P-type mosfet device 570 having its source connected to ground and its gate connected to the output point H of the shift register power switch 388 to receive −V switched whenever the shift register power switch is enabled. A second P-type mosfet device 571 has its source connected to the drain of transistor 570 and its drain connected to −V through a resistor 575. The gate of transistor 571 is connected to the data output point P of the shift register. A resistor 572 is connected between −V and the source lead of transistor 571.

A N-type mosfet device 574 has its gate connected to the drain of transistor 571, its source connected to −V, and its drain connected to the source of transistor 543 of oscillator 542 which provides a 450 kHz tone when energized. Whenever transistor 574 is energized, oscillator 542 will be enabled.

A P-type mosfet device 576 has its gate connected to the drain of transistor 571, its source connected to −V through resistor 572, and its drain connected to −V through a resistor 577. The drain of transistor 576 is also connected to the gate of an N-type mosfet device 578. Transistor 578 has its source connected to −V and its drain connected to the source of transistor 531 of oscillator 530 which provides the 500 kHz signal when energized. Suitable mosfets are types 2N4351 and 2N4352.

Transistors 578 and 574 supply energizing voltage to the quenching modulator oscillators 530 and 542, respectively. A gate circuit, formed by transistors 576, 571 and 570, determines which of the transistors 578 or 574 is turned on to enable either oscillator 530 or 542.

When the shift register power switch is energized, transistor 570 is turned on by the −V potential at its gate, and accordingly, the ground at its source lead is reflected at the drain lead. The gate of transistor 571 is connected to point P, the data output of the shift register. When a logic 1 or ground level appears at the output of the shift register, transistor 571 is turned off and −V potential at the drain of transistor 571 through resistor 573 will turn on transistor 576. The ground potential at the drain of transistor 570 will be extended from source to drain of transistor 576 to the gate of transistor 578 turning on transistor 578 so that the −V potential at the source of transistor 578 will be extended to the drain of transistor 578 and to the source of transistor 531 of oscillator 530 energizing oscillator 530 so that a 500 kHz tone, representing a logic 1 is generated.

Alternately, if a logic 0 is present at the output P of the shift register, transistor 571 will be turned on due to the presence of the −V potential at its gate and the ground potential source of transistor 571 will be extended to the gate of transistor 574 turning transistor 574 on. The −V potential at the source of transistor 574 will be extended to the drain of transistor 574 and to the source of transistor 543 of oscillator 542 energizing the oscillator so that the 450 kHz tone is generated representing a logic 0.

Transmission of the Reply from the Transponder

The 29 data bits transmitted from the van during bit times 0 to 28 are used to select the meter to be read out. During bit times 29 to 57, shown in FIG. 2c, the meter reading data will be passed to the shift register and transmitted back to the van.

The meter reading data for the addressed meter is transferred to the shift register from the two-out-of-five code generator circuits 412-416 during bit time 29. 29 logic 1 signals or 3 kHz tones are transmitted from the van during bit times 29 to 57 as shown in FIG. 2c line B, and are used to read out the information stored in the shift register, a bit at a time for transmission back to the van.

During bit time 29 after the data is entered into the shift register and the transmitter latch circuit 490 is energized, providing operating power to the locked oscillator circuit 510. Since during bit time 29 the pulse transmitted from the van causes a parallel data entry gate clock pulse J to be generated, the pulse transmitted during bit time 29 is not entered into the shift register.

At bit time thirty, a serial data entry clock pulse, I is generated and gates the logic 1 pulse transmitted from the van into the shift register. As the logic 1 signal provided during bit time 30 is accepted into stage A-1 of the shift register, the control bit, which is stored in stage F-6 of the shift register 700, is shifted out of the register, and the logic 1 stored in stage F-5 is shifted to stage F-6 and, as shown in FIG. 2c line P, the output at point P of the shaft register is a logic 1.

Thus, during bit time 30 the quenching modulator, 511 is energized to provide a logic 1 output as shown in line Q of FIG. 2c. Similarly, during bit times 31 to 34, a sequence of logic outputs 0010 which represent the remaining four bits of the five bit word which codes the reading of the meter disc 411 in a two-out-of-five code will enable the quenching modulator to generate quenching signals to supply base drive to the locked oscillator which in turn will generate a spectrum of side band frequencies of either 500 kHz or 450 kHz spacings to represent the logic 1 or logic 0 data, respectively.

During bit time 35 to 49, the meter information stored in a two out of five code in sections E, D and C of the shift register will be advanced to stage F-6 at the output of the register, a bit at a time and will selectively enable the modulator driver 511 to provide the logic 1 or logic 0 quenching frequency signal to the locked oscillator 510.

During bit times 50 to 57 coded signals representing the last two digits of the meter identification number, in this example a 6 and a 9, will have been advanced to the output stage F-6 of the register.

Each of the side bands generated by the locked oscillator has the same tone burst modulation (3 kHz) as received on the interrogating carrier transmitted from the van. A spectrum of output signals is transmitted by the transponder in response to each readout signal transmitted from the van during bit times 29 to 57.

At approximately bit time 60, the shift register power switch 388 will turn off as shown in line H of FIG. 2c and the transmitter latch circuit 490 will turn off.

The maximum side band output of the transponder is limited to approximately −16 dbm for input signals of −80 dbm or stronger. The side band output drops off as the input signal is reduced below −80 db. There is an increase in the sensitivity of the receiver from −60 dbm to −80 dbm whenever the locked oscillator and quenching modulator are turned on during the meter read out protion of the interrogation cycle. This change in sensitivity is used advantageously by increasing the interrogating transmitter power during the meter selection portion of the interrogation cycle (bit times 0 to 28) at which time the van receiver is inoperative and the transponder receiver is in a low sensitively condition. During the meter reply cycle (bit times 29 to 57), the receiver must detect the transponder reply. A maximum transmitter power of 0.1 watts is tolerable at this time or receiver desensitization will occur. The increase in the transponder receiver sensitivity at this time tends to equalize the two transmission paths, and accordingly, the transmitting power of the van can be decreased while the read out signals are being transmitted.

The signals generated by the locked oscillator circuit 510 are passed through resistors 303 and 304 of the coupling network through the antenna 301 and are transmitted to the van.

Detection of Transmitted Data at Van

Referring to FIG. 12, the spectrum of frequencies generated for each data bit stored in the shift register and transmitted a bit at a time to the van are received at the antenna 950 of the van and are passed through a directional filter 951 to a mixer 952 which, in conjunction with a crystal oscillator 953 of a frequency of 432 mHz, decreases the 450 mHz signal carrier to 18 mHz.

The output of the mixer is passed to a receiver 954, which may be for example a Collins Radio Corp. Type R390 receiver. The receiver 954 is tuned to one of the stronger 500 kHz side bands to detect logic 1 signals. The absence of a logic 1 signal is interpreted as a logic 0 signal. Signals at the output of the receiver 954 will consist of 3 kHz tone bursts whenever a logic 1 is contained in the reply data.

The tone bursts pass through an amplifier 955, a limiter 956 and a tone filter 957 to a 3 kHz tone detector 358. Filter 957 is a narrow band filter having a Q of approximately 100. To prevent signal build up due to noise present when a logic 0 (or no tone) is received a filter clamp 959 under the control of a program control unit 960 is used to short out the filter 957 between tone bursts. Since read out of the remote meter is controlled from the van by the program control unit 960, the program control unit can enable the filter clamp 959 at the end of each read out pulse.

The logic 1 outputs of the tone detector 958 are passed through a buffer stage 962 to a data storage and decoder circuit 963 which decodes the two-out-of-five meter data representing the reading 8,579,000 and the two, four bit binary coded data which represents the last two digits, 69, of the meter identification number.

The decoded data is passed to an error detector circuit 965 controlled by the program control unit 960 and a digital printer 970 which prints the received data on a suitable record.

I claim:

1. A system for selectively obtaining information from a plurality of remotely located data indicating devices, comprising: control station means having means for providing interrogate signals of a predetermined frequency for effecting the read out of the information at a selected indicating device, a transponder for each indicating device including receiver means and data means enabled by said interrogate signals coupled to said receiver means to provide data signals which represent the information at the selected indicating device, and data transmit means including locked oscillator means having first and second inputs, first means for coupling said interrogate signals to said first locked oscillator input and to said receiver means, and second means connected to the second input of said locked oscillator and controlled by each of said data signals to vary the gain of said locked oscillator means over a predetermined range which includes the gain value at which a plurality of frequency signals which are related in frequency to the interrogate signals are generated for transmission back to said control station means.

2. A system as set forth in claim 1 in which said means of said control station means includes carrier signal generating means for generating carrier signals and readout signal generating means for generating readout signals for modulating said carrier signals to provide said interrogate signals.

3. A system as set forth in claim 2 in which said locked oscillator means generates frequency signals which are side bands of said carrier signals modulated by said readout signals.

4. A system as set forth in claim 3 in which certain ones of said data signals represent logic 1 levels and certain others of said data signals represent logic 0 levels, said second means being responsive to said data signals to effect the generation by said locked oscillator of first and second sets of sidebands of said carrier signals to represent logic 1 and logic 0 data signals respectively.

5. A system as set forth in claim 4 in which said second means includes first oscillator means, second oscillator means and switch means responsive to each of said certain ones of said data signals to enable said first oscillator means to effect the generation of said first set of sidebands and to each of said certain other data signals to enable said second oscillator means to effect the generation of said second set of sidebands.

6. A system for selectively obtaining information from a plurality of remotely located data indicating devices comprising: control station means having select means for providing carrier signals of a predetermined frequency and select and read out signals for modulating said carrier signals to permit transmission of said select and readout signals to said data indicating devices for selecting one of said indicating devices and for controlling the read out of the information at a selected indicating device, a transponder for each indicating device including receiver means and data means responsive to said read out signals coupled to said receiver means to provide data signals which represent the information at the selected indicating device, data transmit means including locked oscillator means, input means for coupling said carrier signals to said receiver means and to said locked oscillator means, and quenching modulator means controlled by said data signals for providing variable drive signals for said locked oscillator means to enable said locked oscillator means to amplify said carrier signals for coupling to said receiver means over said input means and to generate side bands of said carrier signals.

7. A system as set forth in claim 6 in which said quenching modulator means includes means selectively controlled by said data signals for effecting the generation of different sets of sidebands to represent said data signals.

8. A system for selectively obtaining a predetermined pattern of bits representative of information from a plurality of remotely located data indicating devices, comprising: control station means having select means for transmitting interrogate signals including select signals and bit readout signals to said data indicating devices for selecting one of said indicating devices and reading out each bit of the information at said selected indicating device under the control of the bit readout signals, one bit being read out for each readout signal provided at said data indicating device, a transponder for each indicating device including data means enabled by said select means to provide data signals which represent the information at the indicating device, said data means including data storage means for storing said data signals and means for serially gating said readout signals into said data storage means as said read out signals are received at said transponder for serially reading out said data signals, and data transmit means including locked oscillator means controlled by each of the data signals, as said data signals are read out, to transmit frequency signals to said control station means indicating the information provided by said indicating device.

9. A system as set forth in claim 8 in which said select means includes carrier signal generating means for providing carrier signals for transmission between said control station means and said indicating devices to serve as a transmission medium for said select and readout signals.

10. A system set forth in claim 9 in which said data means further includes signal receiving means having detect means for separating said select and readout signals from said carrier signals.

11. A system as set forth in claim 10 in which said data transmit means further includes drive means for said locked oscillator means responsive to said data signals for driving said locked oscillator means to effect the generation of frequency signals by said locked oscillator means which are sidebands of said carrier signals.

12. A system as set forth in claim 11 in which said transponder includes means for coupling said frequency signals generated by said locked oscillator means to said signal receiving means whereby said frequency signals reinforce the carrier signals being received thereby increasing the sensitivity of said signal receiving means.

13. A system for selectively obtaining information from a plurality of remotely located data indicating devices, comprising: control station means having select means for providing select signals for selecting one of said indicating devices and for providing readout signals comprised of a predetermined number of interrogate data bits for controlling the readout of the information at said selected indicating device from said control station means, a transponder for each indicating device including data means enabled by each of said readout signals to provide a corresponding output data bit which represents correspondingly information at the selected indicating device, said data means including data storage means for storing said output data bits and means for gating each of said interrogate data bits into said data storage means for effecting serial readout of said output data bits, and data transmit means including signal generating means controlled by the output data bits as gated by the interrogate data bits, to generate frequency signals having a like number of bits for transmission to said control station means.

14. A system as set forth in claim 13 in which said data means includes encoder means for encoding the information at said indicating devices to provide said data signals.

15. A system as set forth in claim 14 in which said information is encoded in a two out of five code.

16. A system as set forth in claim 13 in which said control station means includes means for establishing a transmission path over a communication line connecting said select means and the selected one of said indicating devices for passing said readout signals to said selected indicating device and for passing said frequency signals to said control station means.

17. A system as set forth in claim 14 in which said data means includes transfer means for providing parallel transfer of said data signals from said encoding means to said data storage means.

18. A system as set forth in claim 17 in which said data means includes means enabled by said select means for energizing said transfer means to effect said parallel transfer of said data signals.

19. A system for selectively obtaining a predetermined pattern of bits representative of information from a plurality of remotely located indicating devices comprising: control station means having select means for selecting one of said indicating devices said control station means including bit readout control signal means for providing readout signals for effecting the bit-by-bit readout of the information at said selected indicating device with each bit being read out under the control of the readout signals, one bit being read out of the selected indicating device by one readout signal and means for establishing a transmission path over a communication line connecting said select means and the selected one of said indicating devices for passing said read out signals to said selected indicating device, a transponder for each indicating device including data means enabled by said interrogate means for providing data signals which represent the information at the indicating device, said data means including data storage means for storing said data signals and means for serially gating each of said readout signals into said data storage means for effecting the readout of said data signals, and data transmit means including signal generating means controlled by said data signals, as each of said data signal is read out, to send frequency signals over said transmission path to said control station means, indicating the information provided by said indicating device.

20. A system as set forth in claim 19 in which said signal generating means includes oscillator means controlled by said data signals to generate frequency signals of first and second frequencies for representing said data signals.

21. A system as set forth in claim 19 in which data means includes switch means enabled by said interrogate means for effecting the energization of said data storage means.

22. A system as set forth in claim 20 in which said data storage means comprises a multi-stage shift register having parallel data entry gate means for gating said data signals into said shift register in parallel.

23. A system as set forth in claim 22 in which said data means further includes means controlled by said switch means for enabling said parallel data entry gate means upon selection of said indicating device by said interrogate means.

24. A system for selectively obtaining a predetermined pattern of bits representative of information from a plurality of remotely located data indicating devices comprising: control station means having select means for transmitting select signals to said indicating devices for selecting one of said indicating devices and for thereafter transmitting readout signals to said indicating devices for effecting the bit-by-bit readout of the information at said selected indicating device each bit being read out at said indicating device under the control of said select means, a transponder for each indicating device including data storage means, means for providing data signals which represent the information at the indicating device, recognition means responsive to said select signals for effecting the gating of said data signals and to said data storage means, gate means for serially gating said read out signals into said data storage means to effect the serial read out of said signals, and data transmit means controlled by each of the data signals read out of said data storage means to transmit frequency signals to control station means provided by said indicating device.

25. A system as set forth in claim 24 in which said transponder includes means responsive to the leading one of said select signals transmitted by said control station means for effecting the energization of said data storage means.

26. A system as set forth in claim 24 in which said select signals are coded to represent an identification number for the selected indicating device, said gate means being effective to gate said select signals into said data storage means, the recognition means of the selected indicating device transponder being operable in response to the storage of select signals representing said identification number in said data storage means to effect the gating of said data signals into said data storage means.

27. A system as set forth in claim 26 in which said transponder includes means responsive to said select signals to generate gating signals for enabling said gate means to gate said select signals into said data storage means, and responsive to said readout signals to generate further gating signals for enabling said gate means to gate said readout signals into data storage means.

28. A system as set forth in claim 24 which includes further gate means responsive to said recognition means for gating said data signals into said data storage means in parallel.

29. A system as set forth in claim 26 in which said transponder includes transmitter latch means controlled by said recognition means whenever said selected indicating device is selected to be read out to provide an energizing potential for said data transmit means to permit the transmission of said frequency signals to said control station means.

30. A system as set forth in claim 24 in which said data transmit means includes locked oscillator means and drive means for providing drive signals for said locked oscillator means for effecting the generation of said frequency signals by said locked oscillator means.

31. A system as set forth in claim 30 in which said locked oscillator means includes semiconductor means and in which said drive means provides varying drive signals for said semiconductor means for driving said semiconductor means through successive regions of operation so that said semiconductor means functions as a high gain amplifier, as an oscillator, and is then cut off, said frequency signals being generated while said semiconductor means is operating as a high gain amplifier.

32. A system for selectively obtaining information from a plurality of remotely located data indicating devices, comprising; control station means having select means for providing carrier signals and select tones of first and second frequencies for selectively modulating said carrier signals to permit transmission of said select tones to said indicating devices for selecting one of said indicating devices, and for thereafter providing further carrier signals modulated by readout tones of said first frequency to permit transmission of said readout tones to said indicating devices for effecting the readout of the information at said selected indicating device, a transponder for each indicating device including means for providing data signals which represent the information at the indicating device, means for detecting said select and readout tones, first tone detecting means for providing a first select output signal for each select tone of said first frequency detected and a readout output signal for each readout tone detected, second tone detecting means for providing a second select output signal for each select tone of said second frequency detected, shift register means, recognition means responsive to said first select output signals for effecting the gating of said data signals into said shift register means, gate means for serially gating said readout output signals into said shift register means to effect the serial readout of said data signals, and data transmit means controlled by each of said data signals read out of said shift register means to transmit frequency signals to said control station means, indicating the information provided by said indicating device.

33. A system as set forth in claim 32 in which said data transmit means includes locked oscillator means.

34. A system as set forth in claim 33 in which said data transmit means further includes drive means for said locked oscillator means responsive to said data signals for driving said locked oscillator means to effect the generation of frequency signals which are sidebands of said carrier signals.

35. A system as set forth in claim 34 in which said gate means is effective to gate said first select output signals into said shift register means for enabling said recognition means.

36. A system as set forth in claim 35 in which said transponder includes further gate means controlled by said recognition means for effecting the parallel entry of said data signals into said shift register means.

37. A system as set forth in claim 36 in which said transponder includes clock pulse generating means responsive to said select output signals and said readout output signals for providing gating pulses for enabling said gate means and said further gate means.

38. A system for selectively obtaining information from a plurality of remotely located data indicating devices, comprising: control station means having select means for wirelessly transmitting interrogate signals including select signals and read out signals to said data indicating devices for selecting one of said indicating devices and effecting the readout of the information at said selected indicating device, a transponder for each indicating device including data means enabled by said select means to provide data signals which represent the information at the indicating device, said data means including data storage means for storing said data signals and means for serially gating said readout signals into said data storage means as said readout signals are received at said transponder for serially reading out said data signals, and data transmit means including RF locked oscillator means controlled by each of the data signals, as said data signals are read out, to wirelessly transmit frequency signals to control station means indicating the information provided by said indicating device.

39. A system for selectively obtaining information from a plurality of remotely located data indicating devices, comprising: control station means having select means for providing RF carrier signals and select tones of first and second frequencies for selectively modulating said RF carrier signals to permit wireless transmission of said select tones to said indicating devices for selecting one of said indicating devices, and for thereafter providing further RF carrier signals modulated by readout tones of said first frequency to permit transmission of said readout tones to said indicating devices for effecting the readout of the information at said selected indicating device, a transponder for each indicating device including means for providing data signals which represent the information at the indicating device, means for detecting said select and readout tones, first tone detecting means for providing a first select output signal for each select tone of said first frequency detected and the readout output signal for each readout tone detected, second tone detecting means for providing a second select output signal for each select tone of said second frequency detected, shift register means, recognition means responsive to said first select output signals for effecting the gating of said data signals into said shift register means, gate means for serially gating said read out output signals into said shift register means to effect the serial readout of said data signals, and data transmit means controlled by each of said data signals read out of said shift register means to wirelessly transmit frequency signals to said control station means, indicating the information provided by said indicating device.

40. A system for selectively obtaining information from a plurality of remotely located data indicating devices comprising: control station means having means for providing interrogate signals for effecting the read out of the information at a selected indicating device, a transponder for each indicating device including receiver means for receiving interrogate signals and data means responsive to the received interrogate signals to provide data signals which represent the information at the selected indicating device, and data transmit means having locked oscillator means including semiconductor means, quenching modulator means controlled by said data signals for providing variable bias signals for varying the operation point of said semiconductor means so that said semiconductor means is operable to function consecutively as a low gain amplifier, a high gain amplifier, an oscillator and then to be cut off, and coupling means for coupling the received interrogate signals to said locked oscillator means to enable said locked oscillator means to generate frequency signals which are side bands of said interrogate signals whenever said semiconductor means is biased for operation as a high gain amplifier.

41. A system as set forth in claim 40 wherein certain ones of said data signals provided by said data means represent the logic 1 levels and other ones of said data signals represent logic 0 levels, and said quenching modulator means is responsive to said certain ones of said data signals to provide bias signals of a first frequency for said semiconductor means and is responsive to said other ones of said data signals to provide bias signals of a second frequency for said semiconductor means and in which said locked oscillator means is responsive to the bias signals of said first frequency to generate a first set of side band signals representing logic 1 data levels and in response to bias signals of said second frequency to generate a second set of side band signals representing logic 0 data levels.

42. A system as set forth in claim 40 wherein said locked oscillator means is operable to amplify the interrogate signals coupled to said locked oscillator means and in which said coupling means includes means for coupling the amplified interrogate signals to said receiver means, whereby the amplified interrogate signals reinforce the interrogate signals provided by said control station means thereby increasing the sensitivity of said receiver means.

43. A system as set forth in claim 40 in which said coupling means includes a tuned circuit connected to the locked oscillator means.

44. A system as set forth in claim 43 in which said coupling means includes an attenuation network connected between said tuned circuit and said receiver means.

45. A system including a mobile unit having means selectively obtaining information from a remotely located device, said mobile unit having transmitter means for providing signals of a predetermined frequency in the direction of said remotely located device, said remotely located device comprising a transponder including receiver means and identification means responsive to said received frequency signals transmitted by said mobile unit to provide identification signals which identify the remotely located device, and transmit means including locked oscillator means having first and second inputs, first means for coupling said received frequency signals to said first locked oscillator input at the said receiver means, and second means connected to the second input of said locked oscillator and controlled by each of said identification signals to vary the gain of said locked oscillator means over a predetermined range to thereby modify the received frequency signals with identification information for transmission back to said mobile unit.

46. A system as set forth in claim 45 wherein said second means includes quenching modulator means controlled by said identification signals to provide variable drive signals to enable said locked oscillator means to amplify said frequency signals for coupling to said receiver means over said first means and to generate side bands of said frequency signals for transmission back to said mobile unit.

47. A system as set forth in claim 45 wherein said second means includes quenching modulator means controlled by said identification signals to provide first and second drive signals, and means for coupling said drive signals to said locked oscillator means to provide first and second signals in a preselected sequence representing the identification of said remotely located device.

48. A system as set forth in claim 45 wherein said first means includes antenna means, first signal coupling means connected between said antenna means and the first input of said locked oscillator means, whereby the received frequency signals are amplified by said locked oscillator means, and second signal coupling means connected between said antenna means and said receiver means to couple said received signals to said receiver means along with the frequency signals as amplified by said locked oscillator means to thereby reinforce said received frequency signals.

49. A system including a mobile unit having means for selectively obtaining information from a remotely located device, said mobile unit having transmitter means for providing signals of a predetermined frequency in the direction of said remotely located device, said remotely located device comprising a transponder including receiver means, identification means responsive to said received frequency signals transmitted by said mobile unit to provide identification signals which identify the remotely located device, and transmit means including locked oscillator means, input means for coupling said frequency signals to said receiver means and to said locked oscillator means, and quenching modulator means controlled by said identification signals for providing variable drive signals for said locked oscillator means to enable said locked oscillator means to amplify said frequency signals for coupling to said receiver means over said input means and to generate side bands of said frequency signals representing an identity of said remotely located device.

* * * * *